(12) United States Patent
Maeda et al.

(10) Patent No.: US 9,154,726 B2
(45) Date of Patent: *Oct. 6, 2015

(54) CONTENT DATA TRANSMISSION SYSTEM AND CONTENT DATA TRANSMISSION METHOD

(75) Inventors: Koji Maeda, Kanagawa (JP); Masaichi Yoshida, Kanagawa (JP); Yuji Ota, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 1 day.

This patent is subject to a terminal disclaimer.

(21) Appl. No.: 14/235,836

(22) PCT Filed: Jul. 27, 2012

(86) PCT No.: PCT/JP2012/069148
§ 371 (c)(1),
(2), (4) Date: Jan. 29, 2014

(87) PCT Pub. No.: WO2013/018701
PCT Pub. Date: Feb. 7, 2013

(65) Prior Publication Data
US 2014/0193134 A1 Jul. 10, 2014

(30) Foreign Application Priority Data

Jul. 29, 2011 (JP) ................................. 2011-166728
Jul. 29, 2011 (JP) ................................. 2011-166973
Sep. 27, 2011 (JP) ................................. 2011-210492

(51) Int. Cl.
*H04N 5/932* (2006.01)
*H04N 5/765* (2006.01)
(Continued)

(52) U.S. Cl.
CPC .......... *H04N 5/775* (2013.01); *G11B 20/10009* (2013.01); *G11B 20/10222* (2013.01); *H04N 21/4307* (2013.01); *H04N 21/4325* (2013.01); *H04N 21/43632* (2013.01); *H04N 5/76* (2013.01)

(58) Field of Classification Search
CPC ............... H04N 5/765; H04N 21/4307; H04N 21/4325; G11B 20/10009; G11B 20/10222
USPC ........... 386/201, 353, 248; 725/80, 118, 148; 348/500, 725
See application file for complete search history.

(56) References Cited

U.S. PATENT DOCUMENTS

| 6,608,841 B1 | 8/2003 | Koodli |
| 6,724,736 B1 | 4/2004 | Azriel |

(Continued)

FOREIGN PATENT DOCUMENTS

| JP | 2003-32572 | 1/2003 |
| JP | 06-296173 | 10/2006 |

(Continued)

*Primary Examiner* — Helen Shibru
(74) *Attorney, Agent, or Firm* — Peter A. Nieves; Sheehan Phinney Bass + Green PA

(57) ABSTRACT

[Problem] In a system that transmits content data from a content replay device to a content output device, to prevent a deterioration in audio quality or video data picture quality while being able to increase the simplicity of a setting-altering operation without requiring complicated signal processing. [Solution] The present invention is provided with: the content replay device, which receives an operation clock signal transmitted from the content output device via an operation clock transmission cable, operates on the basis of the operation clock signal, and transmits content data replayed by a replay unit to the content output device via a multimedia transmission cable; and the content output device, which generates the operation clock signal transmitted to the content replay device on the basis of an output device operation clock signal, transmits the operation clock signal to the content replay device via the operation clock transmission cable, and receives, performs signal processing on, and outputs to an external device the content data transmitted from the content replay device via the multimedia transmission cable.

9 Claims, 5 Drawing Sheets

(51) Int. Cl.
  *H04N 5/775* (2006.01)
  *G11B 20/10* (2006.01)
  *H04N 21/43* (2011.01)
  *H04N 21/432* (2011.01)
  *H04N 21/4363* (2011.01)
  *H04N 5/76* (2006.01)

(56) References Cited

U.S. PATENT DOCUMENTS

| | | | |
|---|---|---|---|
| 7,449,462 | B2 | 11/2008 | Bryans |
| 7,804,852 | B1 * | 9/2010 | Durham et al. ............... 370/469 |
| 8,000,355 | B2 * | 8/2011 | Ichimura et al. ............. 370/522 |
| 2003/0197537 | A1 | 10/2003 | Saint-Laurent |
| 2005/0053179 | A1 | 3/2005 | Knapp |
| 2008/0046950 | A1 * | 2/2008 | Nakajima ..................... 725/118 |
| 2009/0237561 | A1 | 9/2009 | Kobayashi |
| 2010/0085482 | A1 * | 4/2010 | Toba et al. ..................... 348/554 |
| 2010/0128176 | A1 | 5/2010 | Nakajima |
| 2010/0132001 | A1 | 5/2010 | Kitano et al. |
| 2010/0269137 | A1 | 10/2010 | Nakajima |
| 2012/0287942 | A1 * | 11/2012 | Peng et al. ..................... 370/465 |
| 2013/0194501 | A1 | 8/2013 | Song |
| 2014/0193134 | A1 | 7/2014 | Maeda |

FOREIGN PATENT DOCUMENTS

| | | |
|---|---|---|
| JP | 2007-295514 | 11/2007 |
| JP | 2008-187586 | 8/2008 |
| JP | 2009-038596 | 2/2009 |
| JP | 2010-81434 | 4/2010 |
| JP | 2011-172156 | 9/2011 |
| WO | 2009-110561 | 9/2009 |
| WO | 2009-139386 | 11/2009 |

* cited by examiner

CONTENT DATA TRANSMISSION SYSTEM AND CONTENT DATA TRANSMISSION METHOD

TECHNICAL FIELD

The present invention relates to a content data transmission system for transmitting content data between a content reproduction apparatus (such as disc player) and a content output apparatus.

BACKGROUND ART

There is a system including a content reproduction apparatus (such as a disc player) for reproducing content data (such as video data and audio data) recorded on a recording medium such as a digital versatile disc (DVD) and a Blu-ray Disc (BD) or downloaded via a network from a server or the like, and a content output apparatus (such as an amplifier) for receiving digital data reproduced and output by the content reproduction apparatus, amplifying audio data of the digital data, and outputting the audio data to a speaker, and outputting the audio data and video data to a display apparatus such as a monitor or a television set.

In recent years, a digital interface such as the Institute of Electrical and Electronic Engineers (IEEE) 1394 interface or the High-Definition Multimedia Interface (HDMI) used for the transmission of the content data from the content reproduction apparatus to the content output apparatus is used in this system, and the audio data and the video data reproduced by the content reproduction apparatus can be transmitted as high quality digital data to the content output apparatus.

In the system for transmitting the content data from the content reproduction apparatus to the content output apparatus by using the digital interface, a master clock generated by a clock generation part of the content output apparatus and a master clock generated by a clock generation part of the content reproduction apparatus are not synchronized with each other. Therefore, a jitter is generated in the content data (digital data) received from the content reproduction apparatus, and the content output apparatus thus cannot correctly demodulate the received digital data, and hence noise is generated on an audio signal output from a speaker, the audio signal is interrupted, or an image quality of the video signal degrades.

As a method of synchronizing the master clocks of the content reproduction apparatus and the content output apparatus with each other, Patent Literature 1 discloses a method (transmission apparatus clock control mode) involving generating, by the content output apparatus, a master clock synchronized with the audio data transmitted from the content reproduction apparatus, and demodulating the audio data transmitted from the reproduction apparatus by using the master clock.

Moreover, as another method, Patent Literature 2 discloses a method (reception apparatus clock control mode) involving detecting, by the content output apparatus, whether the master clock generated by the clock generation part and the digital data transmitted from the content reproduction apparatus are synchronized with each other, or not, generating correction information for correcting a loss of the synchronization between the generated master clock and the audio data, and transmitting the correction information to the content reproduction apparatus. In this method, the content reproduction apparatus adjusts the frequency of the master clock based on the correction information received from the content output apparatus, encodes the audio data by using the adjusted master clock, and transmitting the encoded audio data to the content output apparatus.

CITATION LIST

Patent Literature

[PTL 1] JP 06-296173 A
[PTL 2] JP 2003-32572 A

SUMMARY OF INVENTION

Technical Problems

In the method (transmission apparatus clock control mode) involving generating, by an amplification apparatus, the master clock synchronized with the master clock of the reproduction apparatus, thereby synchronizing the master clocks of the reproduction apparatus and the amplification apparatus with each other, which is disclosed in Patent Literature 1, a phase locked loop (PLL) circuit using a clock oscillated from a voltage controlled oscillator (VCO) circuit is used to generate the master clock in the amplification apparatus. The VCO circuit has a permissible range of the clock synchronization of ±1,000 ppm (parts per million) with respect to a center frequency of the clock, and hence a jitter is generated in the generated master clock. Therefore, there is such a problem that, when the audio data transmitted from the reproduction apparatus is demodulated by using the master clock generated by the VCO circuit in the amplification apparatus, a jitter is generated in the audio data, and a sound quality of the audio data output from the amplification apparatus degrades. Moreover, this situation leads to degradation in image quality in a case of the video data.

In the method (reception apparatus clock control mode) involving adjusting the frequency of the master clock of the reproduction apparatus so as to synchronize with the master clock generated by the amplification apparatus, thereby synchronizing the master clocks of the reproduction apparatus and the amplification apparatus with each other, which is disclosed in Patent Literature 2, the amplification apparatus makes the adjustment so that the master clock of the reproduction apparatus synchronizes with the master clock of the amplification apparatus. The audio data transmitted from the reproduction apparatus is synchronized with the master clock of the amplification apparatus, and hence a jitter is not generated in the audio data received from the reproduction apparatus in the amplification apparatus. Thus, the amplification apparatus can reproduce the audio data received from the reproduction apparatus at a high sound quality. However, the master clock of the reproduction apparatus for the audio transmission is synchronized with the master clock of the amplification apparatus, and hence, for example, there occurs such a problem that the master clock for video and the master clock for audio cannot be synchronized in the reproduction apparatus, resulting in a momentary stop of a motion picture of the reproduced video data or a reproduction while an image corresponding to one frame is skipped.

In other words, if the master clocks of the content reproduction apparatus and the content output apparatus are synchronized with each other in the reception apparatus clock control mode in the system for transmitting the content data between the content reproduction apparatus and the content output apparatus by using the conventional digital interface, when a recording medium recording only audio data such as the DVD-AUDIO or the Compact Disc-Digital Audio (CD- DA) is reproduced, the content output apparatus can reproduce the audio data received from the content reproduction apparatus at a high sound quality. However, when a recording medium recording audio data and video data such as the DVD-VIDEO is reproduced, such problems as the momentary stop of the motion picture of the reproduced video data and the reproduction while an image corresponding to one frame is skipped occur.

On the other hand, if the master clocks of the reproduction apparatus and the amplification apparatus are synchronized with each other in the transmission apparatus clock control mode, when a recording medium recording audio data and video data is reproduced, such problems as the momentary stop of the motion picture of the reproduced video data and the reproduction while an image corresponding to one frame is skipped can be prevented from occurring. However, the content output apparatus demodulates the audio data transmitted from the content reproduction apparatus by using the master clock generated by the VCO circuit, and hence such a problem that a jitter is generated in the audio data and the sound quality of the audio data degrades occurs.

As described above, in the system for transmitting the content data such as the video data and the audio data by using the digital interface from the content reproduction apparatus to the content output apparatus, if only the audio data as well as both the audio data and the video data are transmitted from the content reproduction apparatus, there are such problems that a large number of circuits need to be added, that the complex signal processing needs to be applied, and that the sound quality of the audio data and the image quality of the video data degrade.

Moreover, if the reception apparatus clock control mode and the transmission apparatus clock control mode are used, it is necessary to check whether the content reproduction apparatus and the content output apparatus are compatible with these modes, which, in turn, requires checking whether the apparatus are compatible with these modes by means of mutual communication between both the apparatus, resulting in complex communication steps, and addition of circuits and programs.

Moreover, when these modes are selected, a user needs to change setting of the content reproduction apparatus and the content output apparatus so that those apparatus are compatible with the respective modes. It is relatively easy for a user who knows the modes well to carry out the setting, but it may be difficult for a user who does not know the modes well to carry out the setting. Further, both of the apparatus are respectively operated for setting the modes, and the operation thus takes time and labor.

In view of above-mentioned problems, the present invention has an object to eliminate necessity of the addition of a large number of circuits and complex signal processing, to simplify an operation for changing a setting by a user, and to transmit the data without degrading the sound quality of the audio data and the image quality of the video data in a system for transmitting content data such as video data and audio data from a content reproduction apparatus to a content output apparatus by using a digital interface.

Solution to Problems

According to the invention as claimed in claim 1 of this application, there is provided a content data transmission system including: a content reproduction apparatus for reproducing content data; and a content output apparatus for inputting the content data reproduced by the content reproduction apparatus, applying signal processing to the content data, and outputting the content data, in which: the content reproduction apparatus includes: a reproduction apparatus reference operation clock generation part for generating a reproduction apparatus reference operation clock signal; an operation clock reception part for receiving an operation clock signal transmitted from the content output apparatus via an operation clock transmission cable, and outputting a received operation clock signal synchronized with the operation clock signal; a reproduction apparatus operation clock conversion part for converting any one of the reproduction apparatus reference operation clock signal and the received operation clock signal into a reproduction apparatus operation clock signal; a content reproduction part for operating based on the reproduction apparatus operation clock signal, and reproducing the content data; a data output part for operating based on the reproduction apparatus operation clock signal, and transmitting the content data via a multimedia transmission cable to the content output apparatus; and a reproduction apparatus control part for controlling the overall content reproduction apparatus, and controlling the reproduction apparatus operation clock signal; and the content output apparatus includes: an output apparatus reference operation clock generation part for generating an output apparatus reference operation clock signal; an operation clock transmission part for generating the operation clock signal to be transmitted to the content reproduction apparatus based on the output apparatus reference operation clock signal, and transmitting the operation clock signal via the operation clock transmission cable to the content reproduction apparatus; a data input part for operating based on the output apparatus reference operation clock signal, and inputting the content data transmitted from the content reproduction apparatus via the multimedia transmission cable; an output part for operating based on the output apparatus reference operation clock signal and outputting the content data to an outside; and an output apparatus control part for controlling the overall content output apparatus, and providing control to transmit, to the content reproduction apparatus, the operation clock signal synchronized with the output apparatus reference operation clock signal from the operation clock transmission part.

According to the invention as claimed in claim 2 of this application, in the content data transmission system according to claim 1, when the reproduction apparatus control part detects connection of the multimedia transmission cable, the reproduction apparatus control part checks whether or not the content output apparatus is compatible with an output apparatus clock operation mode in which the content reproduction apparatus operates based on the output apparatus reference operation clock signal, and when the content output apparatus is compatible with the output apparatus clock operation mode, controls the content reproduction apparatus so that the content reproduction apparatus operates in the output apparatus clock operation mode, and when the output apparatus control part of the content output apparatus confirms that the content reproduction apparatus is compatible with the output apparatus clock operation mode, the output apparatus control part provides control to automatically transmit the operation clock signal to the content reproduction apparatus.

According to the invention as claimed in claim 3 of this application, in the content data transmission system according to claim 1 or 2, the reproduction apparatus control part controls, when the operation clock reception part receives the operation clock signal from the content output apparatus, the reproduction apparatus operation clock conversion part so that the reproduction apparatus operation clock conversion part converts the received operation clock signal output by the operation clock reception part into the reproduction apparatus operation clock signal, and controls, when the operation clock reception part fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus reference operation clock generation part into the reproduction apparatus operation clock signal.

According to the invention as claimed in claim 4 of this application, there is provided a content data transmission system including: a content reproduction apparatus for reproducing content data; and a content output apparatus for applying signal processing to the content data reproduced and transmitted by the content reproduction apparatus, and outputting the content data, in which: the content reproduction apparatus includes: a reproduction apparatus reference operation clock generation part for generating a reference operation clock signal; a reproduction apparatus data input/output part for operating based on a reproduction apparatus operation clock signal, outputting the content data via a multimedia transmission cable, receiving an operation clock signal transmitted from the content output apparatus via the multimedia transmission cable, and outputting a received operation clock signal synchronized with the operation clock signal; a reproduction apparatus operation clock conversion part for converting any one of the reference operation clock signal generated by the reproduction apparatus reference operation clock generation part and the received operation clock signal output by the reproduction apparatus data input/output part into a reproduction apparatus operation clock signal; a content generation part for operating based on the reproduction apparatus operation clock signal, and generating the content data; and a reproduction apparatus control part for controlling the overall content reproduction apparatus, and controlling the reproduction apparatus operation clock signal; the content output apparatus includes: an output apparatus reference operation clock generation part for generating a reference operation clock signal; an output apparatus data input/output part for generating the operation clock signal to be transmitted to the content reproduction apparatus based on the reference operation clock signal generated by the output apparatus reference operation clock generation part, transmitting the operation clock signal via the multimedia transmission cable to the content reproduction apparatus, operating based on the output apparatus reference operation clock signal, and inputting the content data transmitted from the content reproduction apparatus via the multimedia transmission cable; an output part for operating based on the reference operation clock signal generated by the output apparatus reference operation clock generation part, and outputting the content data to an outside; and an output apparatus control part for controlling the overall content output apparatus, and providing control to transmit, to the content reproduction apparatus, the operation clock signal synchronized with the output apparatus reference operation clock signal from the output apparatus data input/output part; and the reproduction apparatus control part controls, when the reproduction apparatus data input/output part receives the operation clock signal from the content output apparatus, the reproduction apparatus operation clock conversion part so that the reproduction apparatus operation clock conversion part converts the received operation clock signal output by the reproduction apparatus data input/output part into the reproduction apparatus operation clock signal, and controls, when the reproduction apparatus data input/ output fail to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus reference operation clock generation part into the reproduction apparatus operation clock signal.

According to the invention as claimed in claim 5 of this application, in the content data transmission system according to claim 4, the multimedia transmission cable is a High-Definition Multimedia Interface (HDMI) cable, and the reproduction apparatus data input/output part and the output apparatus data input/output part are HDMI data input/output parts, and the operation clock signal is transmitted over an Audio Return Channel (ARC) transmission line of the HDMI cable.

According to the invention as claimed in claim 6 of this application, there is provided a method of connecting a content reproduction apparatus for reproducing content data and a content output apparatus for inputting the content data reproduced by the content reproduction apparatus, applying signal processing to the content data, and outputting the content data to each other via a multimedia data transmission cable for transmitting the content data and an operation clock transmission cable for transmitting an operation clock signal, thereby transmitting the content data from the content data reproduction apparatus to the content output apparatus, the method including: a step of checking, when connection of the multimedia data transmission cable is detected, whether the content output apparatus is compatible with an output apparatus clock operation mode in which the content reproduction apparatus operates based on an output apparatus reference operation clock signal of the content output apparatus; a step of changing, when the content output apparatus is compatible with the output apparatus clock operation mode, setting in the content reproduction apparatus so as to operate in the output apparatus clock operation mode; a step of generating an operation clock signal based on an output apparatus reference operation clock signal, and transmitting the operation clock signal via the operation clock transmission cable to the content reproduction apparatus; a step of receiving the operation clock signal transmitted via the operation clock transmission cable, and generating a received operation clock signal synchronized with the operation clock signal; a step of converting the received operation clock signal into a reproduction apparatus operation clock signal; a step of operating based on the reproduction apparatus operation clock signal, and reproducing the content data; a step of transmitting the content data via the multimedia transmission cable to the content output apparatus; a step of receiving the content data transmitted from the content reproduction apparatus via the multimedia transmission cable; and a step of operating based on the output apparatus reference operation clock signal, and outputting the content data to an outside.

According to the invention as claimed in claim 7 of this application, there is provided a method of connecting between a content reproduction apparatus for reproducing content data and a content output apparatus for inputting the content data reproduced by the content reproduction apparatus, applying signal processing to the content data, and outputting the content data to each other via a multimedia data transmission cable for transmitting the content data and an operation clock transmission cable for transmitting an operation clock signal, thereby transmitting the content data from the content data reproduction apparatus to the content output apparatus, the method including: a step of generating, by the content reproduction apparatus, a reproduction apparatus reference operation clock signal; a step of receiving, by the content reproduction apparatus, an operation clock signal transmitted from the content output apparatus via the operation clock transmission cable, and outputting a received operation clock signal synchronized with the operation clock signal; a step of converting, by the content reproduction apparatus, any one of the reproduction apparatus reference operation clock signal and the received operation clock signal into a reproduction apparatus operation clock signal; a step of operating, by the content reproduction apparatus, based on the reproduction apparatus operation clock signal, and reproducing the content data; a step of operating, by the content reproduction apparatus, based on the reproduction apparatus operation clock signal, and transmitting the content data via the multimedia transmission cable to the content output apparatus; a step of controlling, by the content reproduction apparatus, the overall content reproduction apparatus, and controlling the reproduction apparatus operation clock signal; a step of generating, by the content output apparatus, an output apparatus reference operation clock signal; a step of generating, by the content output apparatus, the operation clock signal to be transmitted to the content reproduction apparatus based on the output apparatus reference operation clock signal, and transmitting the operation clock signal via the operation clock transmission cable to the content reproduction apparatus; a step of operating, by the content output apparatus, based on the output apparatus reference operation clock signal, and inputting the content data transmitted from the content reproduction apparatus via the multimedia transmission cable; a step of operating, by the content output apparatus, based on the output apparatus reference operation clock signal, and outputting the content data to an outside; a step of controlling, by the content output apparatus, the overall content output apparatus, and providing control to transmit, to the content reproduction apparatus, the operation clock signal synchronized with the output apparatus reference operation clock signal from an operation clock transmission part; and a step of controlling, by the content reproduction apparatus, when receives the operation clock signal from the content output apparatus, so that the reproduction apparatus operation clock conversion part convert the received operation clock signal output by the operation clock reception part into the reproduction apparatus operation clock signal, and controlling, when the operation clock reception part fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus operation clock signal.

According to the invention as claimed in claim 8 of this application, there is provided a method of connecting a content reproduction apparatus for reproducing content data and a content output apparatus for applying signal processing to the content data reproduced and transmitted by the content reproduction apparatus, and outputting the content data to each other via a multimedia data transmission cable for transmitting the content data and an operation clock signal, thereby transmitting the content data from the content data reproduction apparatus to the content output apparatus, the method including: a step of generating, by the content reproduction apparatus, a reproduction apparatus reference operation clock signal; a step of generating, by the content output apparatus, an output apparatus reference operation clock signal; a step of generating, based on the output apparatus reference operation clock signal, an operation clock signal synchronized with the output apparatus reference operation clock signal to be transmitted from the content output apparatus to the content reproduction apparatus, and transmitting the operation clock signal via the multimedia transmission cable to the content reproduction apparatus; a step of receiving, by the content reproduction apparatus, the operation clock signal transmitted from the content output apparatus via the multimedia operation clock transmission cable, and outputting a reproduction apparatus received operation clock signal synchronized with the operation clock signal; a step of converting any one of the reproduction apparatus reference operation clock signal and the reproduction apparatus received operation clock signal into a reproduction apparatus operation clock signal; a step of operating based on the reproduction apparatus operation clock signal, and reproducing the content data; a step of operating based on the reproduction apparatus operation clock signal, and transmitting the reproduced content data via the multimedia transmission cable to the content output apparatus; a step of operating, by the content output apparatus, based on the output apparatus reference operation clock signal, and inputting the content data transmitted from the content reproduction apparatus via the multimedia transmission cable; and a step of operating based on the output apparatus reference operation clock signal, and outputting the content data to an outside, in which the step of converting any one of the reproduction apparatus reference operation clock signal and the reproduction apparatus received operation clock signal into the reproduction apparatus operation clock signal includes converting, when the content reproduction apparatus receives the operation clock signal from the content output apparatus, the reproduction apparatus received operation clock signal into the reproduction apparatus operation clock signal, and converting, when the content reproduction apparatus fails to receive the operation clock signal from the content output apparatus within a predetermined period, the reproduction apparatus reference operation clock signal into the reproduction apparatus operation clock signal.

Advantageous Effects of Invention

According to the inventions of this application, in the system for transmitting the digital data such as the video data and the audio data from the content reproduction apparatus to the content output apparatus by using the digital interface, it is possible to eliminate necessity of the addition of a larger number of circuits and the complex signal processing to simplify the operation for changing the setting by the user, and to transmit the data without degrading the sound quality of the audio data and the image quality of the video data.

DESCRIPTION OF EMBODIMENTS

First Embodiment

Now, a description is given of a first embodiment of the present invention with reference to the accompanying drawings.

Figure 1:
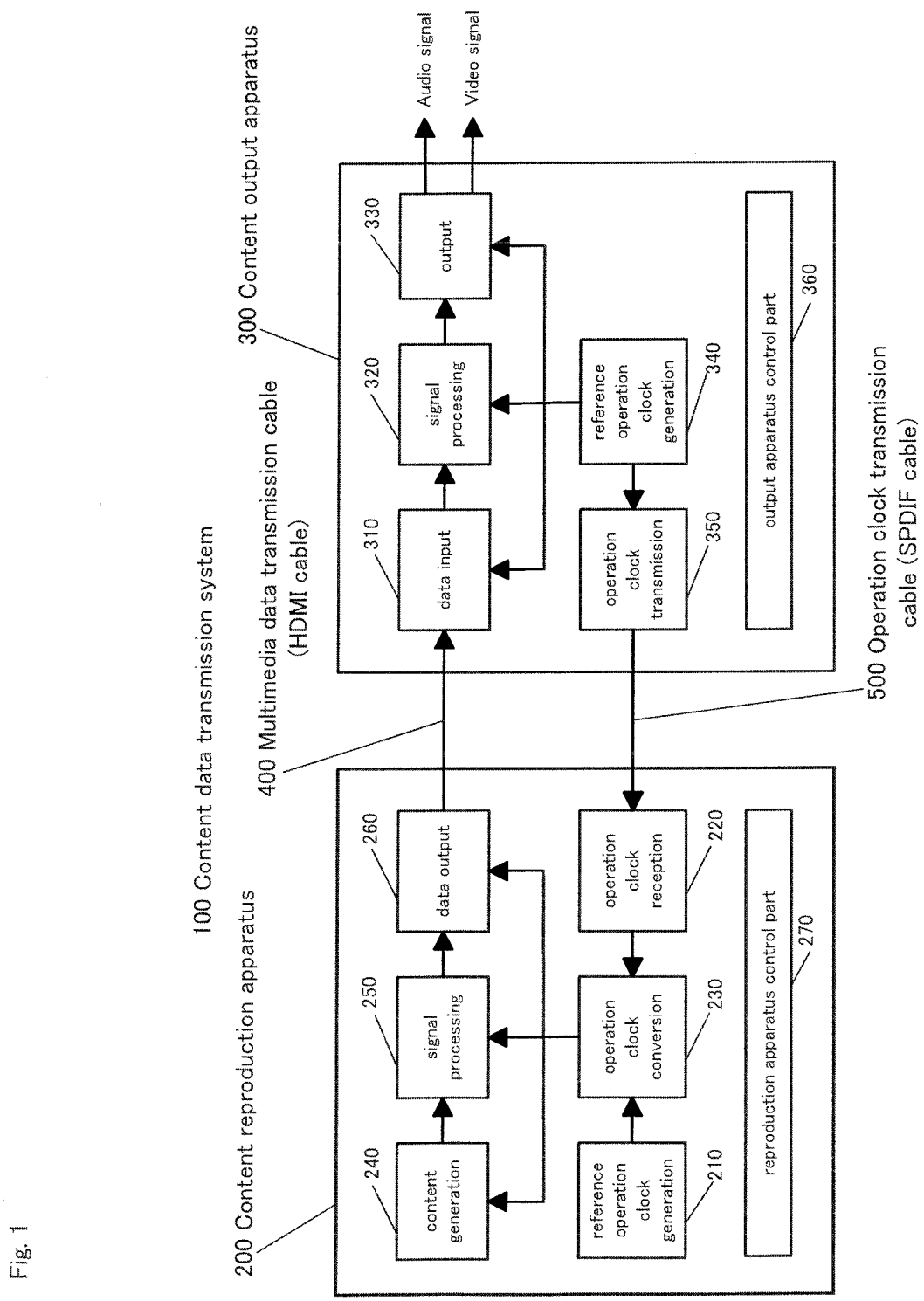
FIG. 1 is a diagram illustrating a schematic configuration of a content data transmission system according to a first embodiment of the present invention.

FIG. 1 is a diagram illustrating a schematic configuration of a content data transmission system according to the first embodiment of the present invention.

In FIG. 1, a content data transmission system 100 includes a content reproduction apparatus 200 and a content output apparatus 300.

The content reproduction apparatus 200 is, for example, a disc player such as a DVD player and a BD player, a memory player for reproducing content data stored in a semiconductor memory, and a network player, which is connected to a network, for downloading digital data via the network from a server or the like. The content reproduction apparatus 200 applies signal processing such as decoding to video data and audio data reproduced from a recording medium such as a disc, or video data and audio data acquired via a network, and outputs the video data and the audio data as digital data.

Moreover, the content output apparatus 300 is, for example, an audio visual (AV) amplifier, an AV receiver, and a network receiver. The content output apparatus 300 applies amplification for an audio signal, signal processing for the surround, signal processing for converting the video data into a video signal which can be displayed on a television set or a monitor, and the like to the video data and the audio data input from an external apparatus directly connected via wires to the content output apparatus 300 or input via a network, and outputs the resultant signal as digital data.

Moreover, the content data is data such as video data, audio data, and a computer program. In this embodiment, a description is given while assuming that the content data is data including video data and audio data.

The content reproduction apparatus 200 and the content output apparatus 300 are connected to each other via a multimedia data transmission cable 400 and an operation clock transmission cable 500 in the content data transmission system 100 according to this embodiment. The content reproduction apparatus 200 and the content output apparatus 300 are connected to each other via the multimedia transmission cable 400 for transmitting the content data. An HDMI cable 400 is used as the multimedia transmission cable 400 for transmitting the content data in this embodiment. A data output part of the content reproduction apparatus 200 and a data input part of the content output apparatus 300 have an interface function compliant with the HDMI, and apparatus authentication and protection of data transfer between the content reproduction apparatus 200 and the content output apparatus 300 can be carried out, and the audio data and the video data can be transmitted over a single cable by using the HDMI cable 400.

Moreover, the content reproduction apparatus 200 and the content output apparatus 300 are connected to each other via the operation clock transmission cable 500 for transmitting an operation clock signal. In this embodiment, a cable compliant with the SPDIF (SPDIF cable 500) is used as the operation clock transmission cable. The data output part of the content reproduction apparatus 200 and the data input part of the content output apparatus 300 have an SPDIF interface function. The SPDIF interface is generally used for transmitting audio data, and can be used inexpensively without a complex circuit configuration.

In this embodiment, the operation clock transmission cable 500 (SPDIF cable 500) is intended to transmit the operation clock signal from the content output apparatus 300 to the content reproduction apparatus 200, and an operation clock signal based on a reference operation clock signal generated by a reference operation clock generation part of the content output apparatus 300 is thus used as a transmission clock for the SPDIF cable 500, and 0 data is transmitted as the audio data. As a result, the content reproduction apparatus 200 does not need to carry out processing such as decoding for unnecessary audio data, and can receive precisely the operation clock signal generated by the content output apparatus 300.

The operation clock transmission cable 500 is used to transmit the operation clock signal from the content output apparatus 300 to the content reproduction apparatus 200 in this embodiment, but the HDMI cable 400 may be used. A data line not used in the HDMI cable 400 may be used to transmit the operation clock signal from the content output apparatus 300 to the content reproduction apparatus 200. Further, a power supply cable for supplying the content reproduction apparatus 200 and the content output apparatus 300 with an electric power may be used. With this, the operation clock transmission cable, and connection parts and interface parts of this cable can be omitted to simplify a circuit configuration.

A description is now given of configurations of the content reproduction apparatus and the content output apparatus of this embodiment. First, a description is given of the content reproduction apparatus 200.

The content reproduction apparatus 200 includes a reproduction apparatus reference operation clock generation part 210, an operation clock reception part 220, a reproduction apparatus operation clock conversion part 230, a content generation part 240, a reproduction apparatus signal processing part 250, a data output part 260, and a reproduction apparatus control part 270.

The reproduction apparatus reference operation clock generation part 210 includes a crystal oscillator (not shown), and generates a reference operation clock signal serving as a reference of an operation clock signal for operating respective parts in the content reproduction apparatus 200. The reference operation clock signal is output to the reproduction apparatus operation clock conversion part 230.

The operation clock reception part 220 receives the operation clock signal transmitted from an operation clock transmission part 350, which is described later, of the content output apparatus 300 via the SPDIF cable 500, converts the frequency of the received operation clock signal into a predetermined frequency by means of an integrated frequency converter (not shown), and outputs the operation clock signal (received operation clock signal), to which the frequency conversion is applied, to the reproduction apparatus operation clock conversion part 230. Specifically, the operation clock reception part 220 receives an operation clock signal at 48 kHz from the content output apparatus, converts the operation clock signal into an operation clock signal at 24 MHz by means of the integrated frequency converter, and outputs the operation clock signal at 24 MHz to the reproduction apparatus operation clock conversion part 230.

The reproduction apparatus operation clock conversion part 230 receives an input of the reference operation clock signal output from the reproduction apparatus reference operation clock generation part 210 or the received operation clock signal output from the operation clock reception part 220, converts, based on control by the reproduction apparatus control part 270, which is described later, any one of the operation clock signals into the operation clock signal at a predetermined frequency, and outputs the converted operation clock signal to the content generation part 240, the signal processing part 250, the data output part 260, and the like, which are described later.

The reproduction apparatus operation clock conversion part 230 includes a first frequency conversion part (not shown), a second frequency conversion part (not shown), and a signal switching part (not shown). The first frequency conversion part is a frequency converter which is high in input frequency gain and compatible with a signal large in frequency variation. The second frequency conversion part is a frequency converter which is low in input frequency gain and compatible with a signal relatively small in frequency variation, and can convert the signal into an operation clock signal having a frequency small in error with respect to a predetermined frequency. The signal switching part switches between the reference operation clock signal output from the reproduction apparatus reference operation clock generation part 210 and the received operation clock signal output from the operation clock reception part 220, which are input to the reproduction apparatus operation clock conversion part 230, based on control by the reproduction apparatus control part 270 described later.

Specifically, the signal switching part switches the input source to any one of the received operation clock signal at 24 MHz output from the operation clock reception part 220 and the reference operation clock signal at 24 MHz generated by the reproduction apparatus reference operation clock generation part 210 based on the control by the reproduction apparatus control part 270 in the reproduction apparatus operation clock conversion part 230. The first frequency conversion part converts the input operation clock signal at 24 MHz into the operation clock signal at 13.5 MHz, and outputs the operation clock signal at 13.5 MHz to the second frequency conversion part. The second frequency conversion part further converts the operation clock signal at 13.5 MHz into an operation clock signal at 27 MHz, and outputs the operation clock signal to the content generation part 240, the reproduction apparatus signal processing part 250, the data output part 260, and the like. Note that, the first frequency conversion part may convert the input operation clock signal at 24 MHz into an operation clock signal at 27 MHz, and may output the operation clock signal at 27 MHz to the second frequency conversion part, and the second frequency conversion part may further convert the operation clock at 27 MHz into the operation clock signal at 27 MHz.

The operation clock signal at 24 MHz input from the operation clock reception part 220 is the received operation clock signal generated based on the operation clock signal at 48 kHz transmitted via the SPDIF cable 500, and is a signal large in frequency variation with respect to the reference frequency. Therefore, the first frequency conversion part high in input frequency gain converts the operation clock signal into the operation clock signal narrow in frequency variation range with respect to the frequency serving as the reference. Specifically, the operation clock signal at 24 MHz is converted into the operation clock signal having a frequency range of 13.5 MHz±5%. Then, the operation clock signal in the frequency range of 13.5 MHz±5% output from the first frequency conversion part is converted into the operation clock signal narrower in frequency variation range with respect to the predetermined frequency and high in precision by the second frequency conversion part low in input frequency gain. Specifically, the operation clock signal in the frequency range of 13.5 MHz±5% is converted into the operation clock signal in a frequency range of 27 MHz±0.5%, and the operation clock signal is output to the content generation part 240, the reproduction apparatus signal processing part 250, the data output part 260, and the like. The content generation part 240, the reproduction apparatus signal processing part 250, the data output part 260, and the like operate in synchronization with the operation clock signal small in error with respect to the predetermined frequency. Therefore, the content generation part 240, the reproduction apparatus signal processing part 250, the data output part 260, and the like operate without a loss in synchronization and the like.

The content generation part 240 reads content data recorded on a disc, or content data stored in a semiconductor memory, and outputs the content data to the reproduction apparatus signal processing part 250 on a subsequent stage. Moreover, the content generation part 240 includes a network connection part (not shown), acquires the content data by downloading the content data stored in a server or the like via a network, or receiving a stream of the content data, and outputs the content data to the reproduction apparatus signal processing part 250 on the subsequent stage.

The reproduction apparatus signal processing part 250 applies various signal processing such as decode processing to the content data input from the content generation part 240. For example, the reproduction apparatus signal processing part 250 applies the decode processing to the audio data and the video data, multi-channel processing to the audio data, and processing such as 3D conversion to the video data.

The data output part 260 converts the content data output from the reproduction apparatus signal processing part 250 into data in a data format which can be transmitted on the cable connected between the content reproduction apparatus 200 and the content output apparatus 300, and outputs the converted content data in order to transmit the content data to the content output apparatus 300 on the following stage. The content reproduction apparatus 200 and the content output apparatus 300 are connected to each other via the HDMI cable 400 in this embodiment. The data output part 260 has an HDMI interface function, and converts data into data that matches the data transmission over the HDMI interface to transmit the content data via the HDMI cable 400 to the content output apparatus 300.

The reproduction apparatus control part 270 controls the overall content reproduction apparatus 200. The reproduction apparatus control part 270 provides control to convert the frequency of the operation clock signal in the reproduction apparatus operation clock conversion part 230 based on the operation clock signal received from the content output apparatus 300, thereby operating the content generation part 240, the reproduction apparatus signal processing part 250, the data output part 260, and the like based on the operation clock signal, and transmitting the content data to the content output apparatus 300.

The reproduction apparatus control part 270 detects whether the operation clock signal can be received from the content output apparatus 300 based on turning on/off of a power supply, setting by a user, the connection of the HDMI cable 400, and the like, and if the operation clock signal can be received from the content output apparatus 300, controls the signal switching part of the reproduction apparatus operation clock conversion part 230 to generate the operation clock signal based on the received operation clock signal received by the operation clock reception part 220, thereby controlling the respective parts in the apparatus to operate. Moreover, the reproduction apparatus control part 270 detects whether the operation clock signal can be received from the content output apparatus 300, and if the reproduction apparatus control part 270 detects that the operation clock signal cannot be received from the content output apparatus 300, controls the signal switching part of the reproduction apparatus operation clock conversion part 230 to generate the operation clock signal based on the reference operation clock signal output by the reproduction apparatus reference operation clock generation part 210, thereby controlling the respective parts in the apparatus to operate.

A description is now given of the content output apparatus 300.

The content output apparatus 300 includes a data input part 310, an output apparatus signal processing part 320, an output part 330, an output apparatus reference operation clock generation part 340, the operation clock transmission part 350, and an output apparatus control part 360.

The data input part 310 receives the content data transmitted via the HDMI cable 400 from the content reproduction apparatus 200. The data input part 310 outputs the received content data to the output apparatus signal processing part 320 on a subsequent stage.

The output apparatus signal processing part 320 applies signal processing to the content data output from the data input part 310, and outputs the processed content data to the output part 330. The signal processing includes, for example, surround conversion processing for the audio data, and signal processing of superimposing an on-screen display (OSD) signal on the video data.

The output part 330 includes an amplification part (not shown) for amplifying the audio data, and a video encoder (not shown) for converting the video data into a video signal format for displaying the video data on a television set or a monitor. The output part 330 separates the content data output from the output apparatus signal processing part 320 into the video data and the audio data, and outputs the video data and the audio data. The audio data is output via the amplification part from output terminals to speakers or the like. The video data is output via the video encoder to a television set or a monitor.

The output apparatus reference operation clock generation part 340 includes a crystal oscillator (not shown), and generates the reference operation clock signal. The reference operation clock signal in this embodiment serves as a reference for the operation clock signal of the content output apparatus 300, and as a reference for the operation clock signal to be transmitted to the content reproduction apparatus 200. Specifically, the output apparatus reference operation clock generation part 340 generates a reference operation clock signal at 24 MHz, and outputs the reference operation clock signal to the data input part 310, the output apparatus signal processing part 320, the output part 330, and the like.

The operation clock transmission part 350 converts the reference operation clock signal generated by the output apparatus reference operation clock generation part 340 to an operation clock signal at the predetermined frequency, and then transmits the operation clock signal via the SPDIF cable 500 to the content reproduction apparatus 200. In this embodiment, the reference operation clock signal at 24 MHz generated by the output apparatus reference operation clock generation part 340 is converted into the operation clock signal having the frequency of 48 kHz, and the operation clock signal is transmitted via the SPDIF cable 500 to the content reproduction apparatus 200.

The output apparatus control part 360 controls the overall content output apparatus 300. The output apparatus control part 360 provides the control of transmitting the reference operation clock signal generated by the output apparatus reference operation clock generation part 340 from the operation clock transmission part 350 via the SPDIF cable 500 to the content reproduction apparatus 200, and the control of receiving the content data transmitted from the content reproduction apparatus 200, applying the signal processing to the content data and then, outputting the content data from the output part 330 to the outside.

A description is now given of the operation of the content reproduction apparatus 200 and the content output apparatus 300 according to this embodiment.

In this embodiment, both the apparatus operate in an output apparatus clock operation mode where the content reproduction apparatus 200 operates based on the operation clock signal generated by the content output apparatus 300, and hence it is necessary for both the apparatus to mutually check whether both the apparatus are compatible with the output apparatus clock operation mode.

The output apparatus clock operation mode is valid only when both the content reproduction apparatus 200 and the content output apparatus 300 are compatible therewith, and the user can also set to turn on/off the output apparatus clock operation mode. The output apparatus clock operation mode is in the off state by default for the content reproduction apparatus 200 and the content output apparatus 300. A description is given of an operation of automatically setting to turn on/off the output apparatus clock operation mode according to this embodiment. The operation mode may be checked when the power supply to the content reproduction apparatus or the content output apparatus is turned on.

When the HDMI cable 400 is connected between the content reproduction apparatus 200 and the content output apparatus 300, and the power supply to the respective apparatus is turned on, or when the power supply is turned on, and then the HDMI cable 400 is connected between both the apparatus, the reproduction apparatus control part 270 or the output apparatus control part 360 carries out mode check processing based on the turning on of the power supply and the detection of the connection of the HDMI cable 400 via the HDMI interface.

A description is now given of the mode check processing. On this occasion, a description is given of such an example that the HDMI cable 400 is connected, and the Consumer Electronics Control (CEC) of the HDMI interface function is used as a communication method during the mode check processing.

Figure 2:
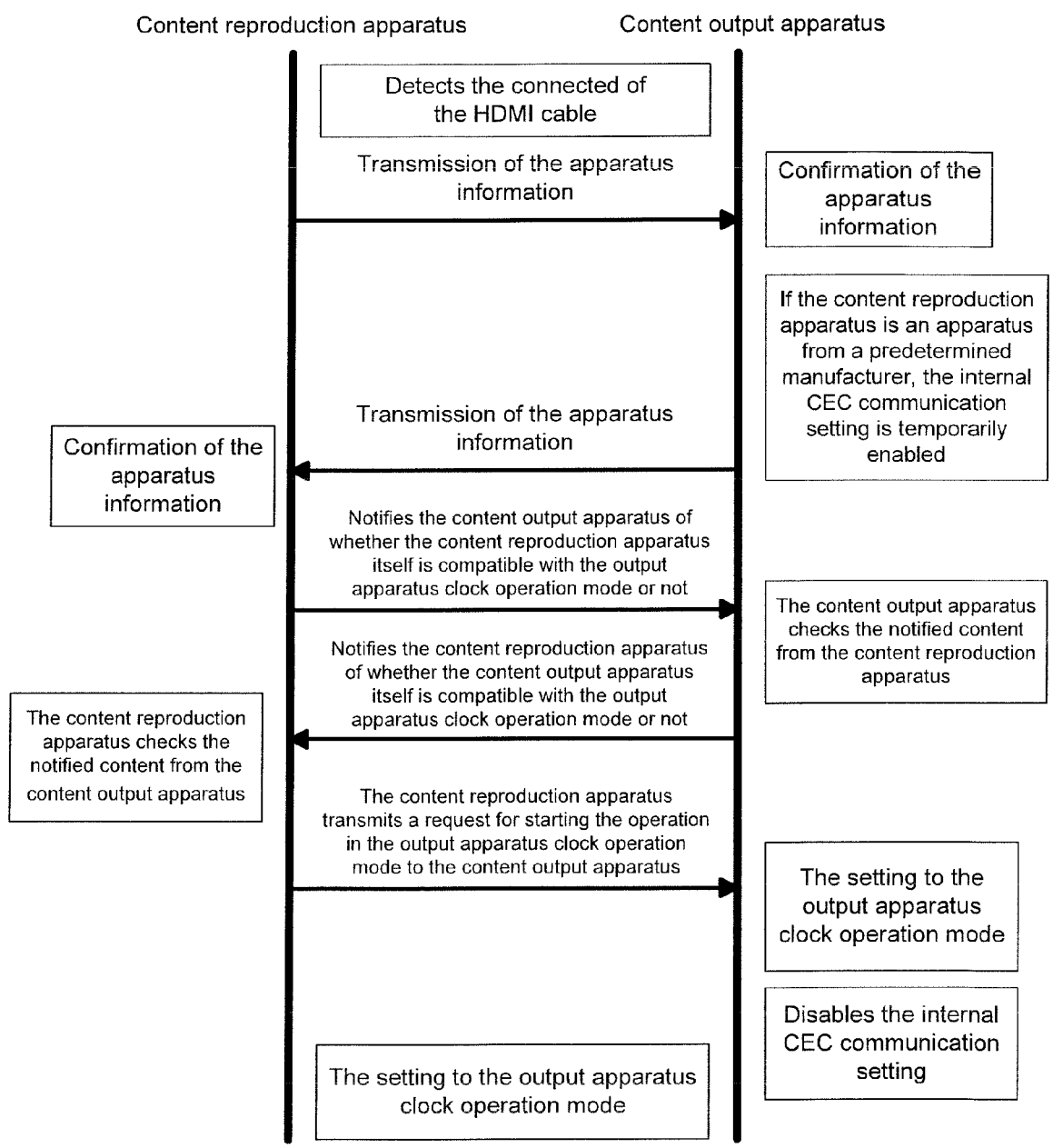
FIG. 2 is a diagram illustrating mode check processing in the content data transmission system according to the first embodiment of the present invention.

FIG. 2 is a diagram illustrating the mode check processing in the content data transmission system according to the first embodiment of the present invention.

When the content reproduction apparatus 200 and the content output apparatus 300 are connected to each other via the HDMI cable 400, the reproduction apparatus control part 270 of the content reproduction apparatus 200 detects that the HDMI cable 400 is connected, and carries out the mode check processing. The output apparatus control part 360 of the content output apparatus 300 also detects that the HDMI cable 400 is connected.

In the content reproduction apparatus 200, the reproduction apparatus control part 270 uses the HDMI interface function of the data output part 260, thereby transmitting apparatus information on the content reproduction apparatus 200 via the HDMI cable 400 to the content output apparatus 300. The apparatus information is information for identifying the apparatus itself (such as a manufacturer name and a model number). On this occasion, the transmission of the apparatus information on the content reproduction apparatus 200 is not based on the CEC communication setting, but is carried out when the HDMI cable 400 is connected.

The content output apparatus 300 receives the apparatus information via the HDMI cable 400 by the data input part 310 from the content reproduction apparatus 200. On this occasion, a table stored in an internal memory (not shown) is referred to based on the apparatus information from the received content reproduction apparatus 200, and if the content reproduction apparatus is an apparatus from a predetermined manufacturer, the internal CEC communication setting is temporarily enabled independently of the CEC communication setting of the content output apparatus 300. The output apparatus control part 360 uses the CEC function of the HDMI interface function of the data input part 310, thereby transmitting, via the HDMI cable 400, the apparatus information on the content output apparatus 300 to the content reproduction apparatus 200.

On the other hand, when the data output part 260 receives the apparatus information from the content output apparatus 300 in the content reproduction apparatus 200, the reproduction apparatus control part 270 refers to the table stored in the internal memory of the reproduction apparatus control part 270, thereby checking whether the content output apparatus 300 is an apparatus from a predetermined manufacturer.

If the content output apparatus 300 is an apparatus from a predetermined manufacturer, the content reproduction apparatus 200 notifies the content output apparatus 300 of whether the content reproduction apparatus 200 itself is compatible with the output apparatus clock operation mode or not by means of the CEC function of the HDMI interface function. Simultaneously, the content output apparatus 300 checks the notified content from the content reproduction apparatus 200, and notifies the content reproduction apparatus 200 of whether the content output apparatus 300 itself is compatible with the output apparatus clock operation mode or not by means of the CEC function of the HDMI interface function.

If the content reproduction apparatus 200 confirms that the content output apparatus 300 is compatible with the output apparatus clock operation mode, the content reproduction apparatus 200 transmits a request for starting the operation in this mode to the content output apparatus 300. The content output apparatus 300 switches the setting to the output apparatus clock operation mode based on the request from the content reproduction apparatus 200. The content output apparatus 300 switches the operation mode, and then, disables the internal CEC communication setting, which has been temporarily enabled.

On this occasion, the apparatus information can be acquired by the method of mutually communicating the apparatus information by means of the CEC function of the HDMI interface function of the HDMI cable 400 as well as a method of transmitting the apparatus information on the content reproduction apparatus 200 as the PACKET information on the HDMI, and transmitting the apparatus information on the content output apparatus 300 as the EDID information. Moreover, whether the apparatus is compatible with the output apparatus clock operation mode can be checked by transmitting the apparatus information on the content output apparatus 300 as the channel bit status information of the SPDIF output, and transmitting the apparatus information on the content reproduction apparatus 200 as the PACKET information on the HDMI.

When the content reproduction apparatus 200 receives information representing start of operation in the output apparatus clock operation mode from the content output apparatus 300, the content reproduction apparatus 200 also changes its own setting to the output apparatus clock operation mode. On this occasion, the mode check processing is finished. When the mode check processing is finished, the content reproduction apparatus 200 and the content output apparatus 300 proceed to operations in the output apparatus clock operation mode.

A description is now given of processing of transmitting the content data between the content reproduction apparatus 200 and the content output apparatus 300.

Figure 3:
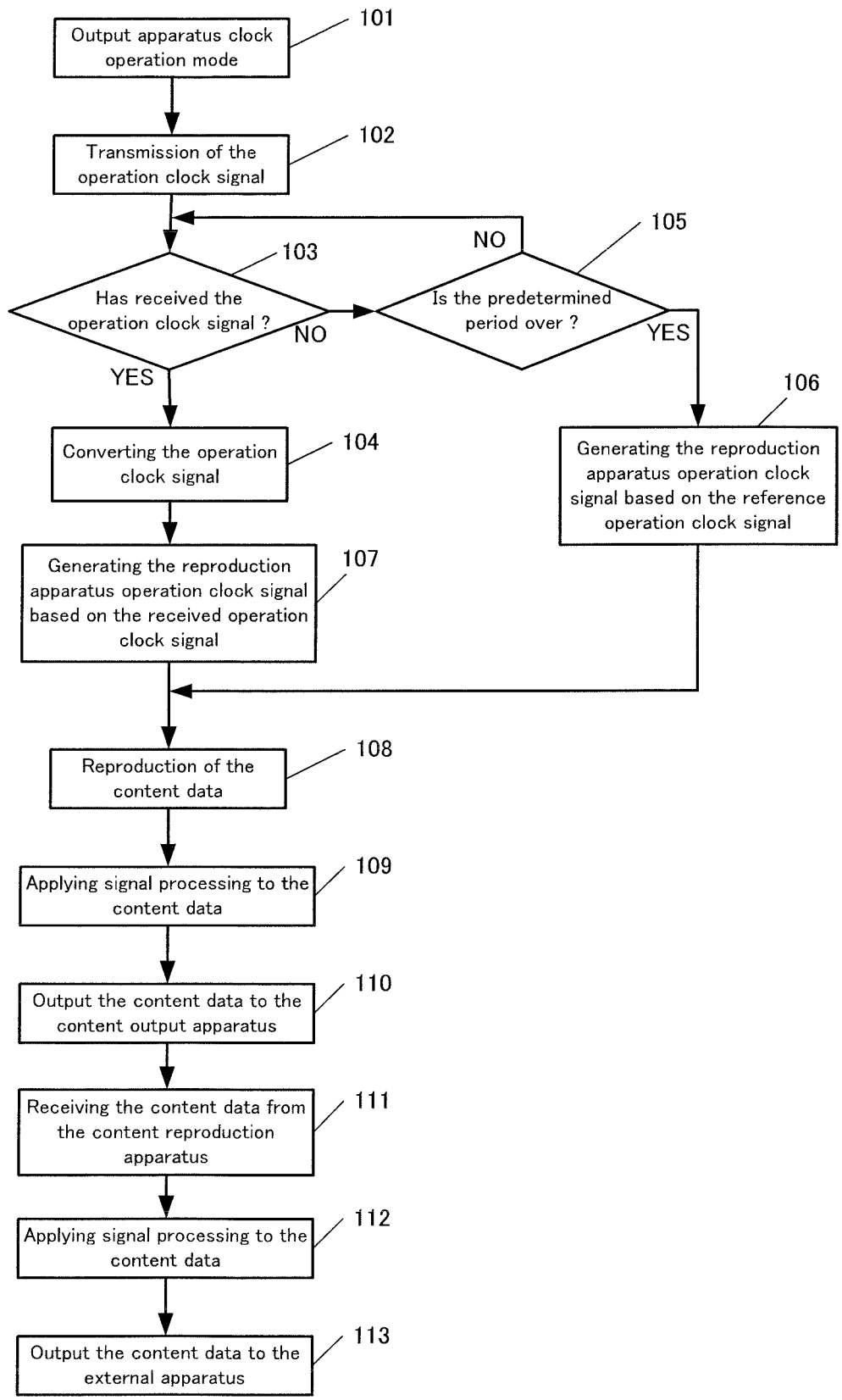
FIG. 3 is a flowchart illustrating processing relating to content data transmission in the content data transmission system according to the first embodiment of the present invention.

FIG. 3 is a flowchart illustrating the processing relating to the content data transmission in the content data transmission system according to the first embodiment of the present invention.

As described before, when the mode check processing is finished, the content reproduction apparatus 200 and the content output apparatus 300 are set to such a state that the content reproduction apparatus 200 and the content output apparatus 300 can operate in the output apparatus clock operation mode (Step 101). When the content output apparatus 300 becomes operable in the output apparatus clock operation mode, the content output apparatus 300 transmits such a notification that the operation clock signal is transmitted via the HDMI cable 400 to the content reproduction apparatus 200, and starts the transmission of the operation clock signal via the SPDIF cable 500 (Step 102).

Specifically, in the content output apparatus 300, the switch of the mode causes the operation clock transmission part 350 to generate the operation clock signal at 48 kHz based on the reference operation clock signal generated by the output apparatus reference operation clock generation part 340, and to start the transmission of the operation clock via the SPDIF cable 500 to the content reproduction apparatus 200.

The reproduction apparatus control part 270 of the content reproduction apparatus 200 checks whether the operation clock reception part 220 has received the operation clock signal at 48 kHz from the content output apparatus 300 or not (Step 103), and when the operation clock reception part 220 receives the operation clock signal, the operation clock reception part 220 converts the received operation clock signal into the received operation clock signal at 24 MHz, and outputs the converted operation clock signal to the reproduction apparatus operation clock conversion part 230 on the subsequent stage (Step 104).

On this occasion, if the operation clock reception part 220 cannot receive the operation clock signal from the content output apparatus 300 within a predetermined period due to a defect of the SPDIF cable 500 or the like after the operation in the output apparatus clock operation mode starts (Step 105), the reproduction apparatus control part 270 switches the output apparatus clock operation mode, and provides such control that the reproduction apparatus operation clock signal is generated based on the reference operation clock signal generated by the reproduction apparatus reference operation clock generation part 210 to operate the apparatus (Step 106). The predetermined period is, for example, approximately five seconds.

If the content reproduction apparatus 200 cannot receive the operation clock signal within the predetermined period from the content output apparatus 300, the reproduction apparatus control part 270 controls the content reproduction apparatus 200 to operate based on the reproduction apparatus operation clock signal generated based on the reference operation clock signal in the content reproduction apparatus 200, and thus such a case that the content data is not output from the content reproduction apparatus 200 for a long period does not occur. As a result, even if a transmission error of the operation clock signal occurs between the content reproduction apparatus 200 and the content output apparatus 300, the user does not need to carry out a complex change in setting, and can listen to the content data via the content output apparatus 300.

Moreover, if the setting is switched from the output apparatus clock operation mode due to the transmission error of the operation clock signal as described above, the reproduction apparatus control part 270 presents such a notification that the mode setting has been changed on a display part (not shown) of the content reproduction apparatus 200, thereby notifying the user of the change. As a result, the user can recognize that the operation is not carried out in the output apparatus clock operation mode. Moreover, if such a defect that the SPDIF cable 500 is disconnected occurs, or a terminal of a connection destination is not correct, the user can recognize the situation.

The reproduction apparatus operation clock conversion part 230 generates the operation clock signal at 27 MHz (reproduction apparatus operation clock signal) synchronized with the received operation clock signal at 24 MHz, and outputs the operation clock signal to the content generation part 240, the reproduction apparatus signal processing part 250, and the data output part 260 (Step 107).

The content generation part 240 operates based on the operation clock signal supplied from the reproduction apparatus operation clock conversion part 230, reads content data from a mounted disc or downloads content data via the network, and outputs the content data to the reproduction apparatus signal processing part 250 (Step 108).

The reproduction apparatus signal processing part 250 also operates based on the operation clock signal supplied from the reproduction apparatus operation clock conversion part 230, applies predetermined signal processing to the content data input from the content generation part 240, and outputs the content data to the data output part 260 (Step 109).

The data output part 260 also operates based on the operation clock signal supplied from the reproduction apparatus operation clock conversion part 230, converts the content data input from the reproduction apparatus signal processing part 250 into content data in a predetermined signal format, and transmits the content data via the HDMI cable 400 to the content output apparatus 300 (Step 110).

The data input part 310 receives the content data output from the content reproduction apparatus 200, converts the signal format into a predetermined format, and then outputs the content data to the output apparatus signal processing part 320 in the content output apparatus 300 (Step 111). The respective parts of the content output apparatus 300 (in FIG. 1, the data input part 310, the output apparatus signal processing part 320, and the output part 330 of the content output apparatus 300) operate based on the operation clock signal generated by the output apparatus reference operation clock generation part 340.

The output apparatus signal processing part 320 applies predetermined signal processing to the content data output from the data input part 310, and outputs the processed content data to the output part 330 (Step 112). The output part 330 amplifies the audio data, applies video encoding processing to the video data, and then outputs the audio data and the video data as the video signal and the audio signal, respectively, to the external apparatus (Step 113).

As described above, when the power supply of the content reproduction apparatus 200 and the content output apparatus 300 is turned on, or the HDMI cable 400 is connected, the content data transmission system 100 according to this embodiment automatically checks whether both the apparatus are compatible with the output apparatus clock operation mode or not, and, if the content data transmission system 100 confirms that both the apparatus are compatible with the mode, the content data transmission system 100 is automatically set to the output apparatus clock operation mode, and operates in the mode. As a result, the user does not need to set the mode each time the power supply is turned on or each time the HDMI cable 400 is connected, resulting in saving time. Moreover, because the mode is automatically set, the user does not make incorrect setting. Further, the operation is carried out in the output apparatus clock operation mode in which the content reproduction apparatus 200 operates based on the operation clock signal of the content output apparatus 300. Thus, and the content data reproduced by the content reproduction apparatus 200 is output from the content output apparatus 300, a jitter between both the apparatus is reduced, and the content data is transmitted without adverse effect on the data transmission.

Moreover, the content data transmission system 100 according to this embodiment transmits the signal representing that the content output apparatus 300 is compatible with the output apparatus clock operation mode, and, if the operation clock reception part 220 has not received the operation clock signal for the predetermined period (such as five seconds) after the signal is received, stops the output apparatus clock operation mode, switches the signal switching part of the reproduction apparatus operation clock conversion part 230, generates the reproduction apparatus operation clock signal based on the reference operation clock signal generated by the reproduction apparatus reference operation clock generation part 210, and operates based on the reproduction apparatus operation clock signal. As a result, even if an output error of the operation clock signal from the content output apparatus 300, a disconnection of the cable, or a connection error of the cable occurs, such a state that the content data cannot be reproduced does not continue, and the reproduction of the content data becomes available in the content reproduction apparatus 200 in a short period.

A description has been given of the content data transmission system 100 according to this embodiment configured so that the mode check processing is carried out in order to check whether the content reproduction apparatus 200 and the content output apparatus 300 are each compatible with the output apparatus clock operation mode or not, but the content data transmission system 100 may be configured so that the mode check processing is not carried out, but data representing that the operation clock signal is output from the content output apparatus 300 is superimposed on the operation clock signal in order to check the reliability of the clock signal input to the operation clock reception part 220, and only if the operation clock signal received on the content reproduction apparatus 200 side is superimposed with the data representing that the operation clock signal is output from the content output apparatus 300, the content data transmission system 100 operates in the output apparatus clock operation mode. For example, if the operation clock transmission part 350 transmits the operation clock to the operation clock reception part 220, the output apparatus control part 360 may control the operation clock transmission part 350 so as to transmit the operation clock signal superimposed with a predetermined bi-phase signal. The reproduction apparatus control part 270 may determine whether the predetermined bi-phase signal is superimposed on the operation clock received by the operation clock reception part 220. If the bi-phase signal is superimposed, the reproduction apparatus control part 270 may provide control so as to operate in the output apparatus clock operation mode, and if the bi-phase signal is not superimposed, may switch the signal switching part of the reproduction apparatus operation clock conversion part 230 to generate the reproduction apparatus operation clock signal based on the reference operation clock signal generated by the reproduction apparatus reference operation clock generation part 210, and may provide control so as to operate based on the reproduction apparatus operation clock signal. As a result, a circuit configuration required for the mode check processing can be omitted, and a time required for the mode check processing can be reduced. Moreover, even if an operation clock signal transmitted from an apparatus other than the content output apparatus 300 is received by any chance while the operation clock transmission cable 500 is connected to the apparatus other than the content output apparatus 300, a jitter can be prevented from being generated on the audio data to be reproduced, and the sound quality and the image quality can be prevented from degrading.

In the content data transmission system 100 according to this embodiment, the operation clock transmission part 350 transmits the operation clock signal at 48 kHz to the operation clock reception part 220, the operation clock signal at 27 MHz is generated from the operation clock signal at 48 kHz, the operation clock signal at 24 MHz, which is the operation clock signal for the 48 kHz system, and an operation clock signal at 22 MHz, which is the operation clock signal for a 44.1 kHz system, are generated from the operation clock signal at 27 MHz, but the content data transmission system 100 may be configured, for example, to switch and transmit the plurality of clock signals. For example, the operation clock transmission part 350 is configured so as to switch and transmit the operation clock signal at 48 kHz and the operation clock signal at 44.1 kHz, and the operation clock reception part 220 is configured to operate based on the received operation clock frequency. As a result, for example, when content data including video data recorded on a recording medium such as a DVD and a BD is reproduced, the switching can be made so as to operate based on the operation clock signal at 48 kHz, and when content data not including video data recorded on a recording medium such as a CD is reproduced, the switching can be made so as to operate based on the operation clock signal at 44.1 kHz, and hence an arbitrary operation clock is selected for operation out of the plurality of the operation clocks depending on content data to be reproduced.

A description has been given of the content data transmission system 100 according to this embodiment with the use of the values of frequency such as 24 MHz, 13.5 MHz, 27 MHz, 48 kHz, and 44.1 kHz as the frequency value of the operation clock signal, but a transmission system may use other arbitrary values of frequency as long as the effect described in this embodiment is provided.

Second Embodiment

A description is now given of a content data transmission system according to a second embodiment of the present invention.

Figure 4:
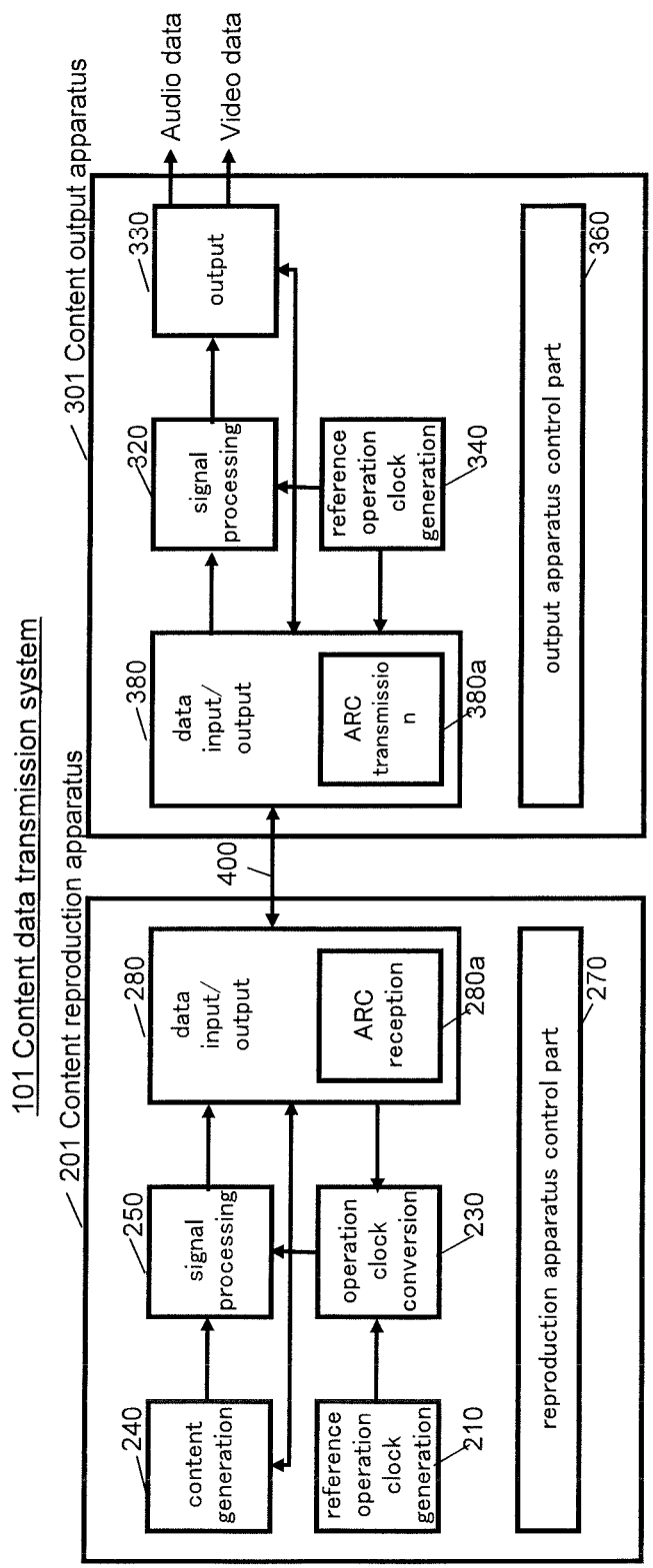
FIG. 4 is a diagram illustrating a schematic configuration of a content data transmission system according to a second embodiment of the present invention.

FIG. 4 is a diagram illustrating a schematic configuration of the content data transmission system according to a second embodiment of the second embodiment of the present invention.

Note that, like configurations are denoted by like numerals as of the first embodiment throughout the drawings, and the descriptions thereof are omitted to facilitate understanding in the content data transmission system according to the second embodiment.

The content data transmission system 101 includes a content reproduction apparatus 201 and a content output apparatus 301.

The content data is data such as video data, audio data, and a computer program. In this embodiment, a description is given while assuming that the content data is data including video data and audio data.

The content reproduction apparatus 201 is, for example, a disc reproduction apparatus such as a DVD player and a BD player, a memory player for reproducing content data stored in a semiconductor memory, and a network player for downloading digital data via the connected network from a server or the like.

The content reproduction apparatus 201 applies signal processing such as decoding to video data and audio data reproduced from a recording medium such as a disc, or video data and audio data acquired via a network, and outputs the video data and the audio data as digital data.

As the content output apparatus 301, for example, an audiovisual (AV) amplifier, an AV receiver, and a network receiver are used. The content output apparatus 301 applies amplification for an audio signal, signal processing for the surround, signal processing for converting the video data into a video signal which can be displayed on a television set or a monitor, and the like to the video data and the audio data input from an external apparatus directly connected or via a network, and outputs the resultant signal as digital data.

The content reproduction apparatus 201 and the content output apparatus 301 are connected to each other via a multimedia data transmission cable 400. The content reproduction apparatus 201 and the content output apparatus 301 are connected to each other via the multimedia data transmission cable 400 for transmitting the content data and the operation clock signal. An HDMI cable is used as the multimedia transmission cable 400 for transmitting the content data and the operation clock signal in this embodiment. A reproduction apparatus data input/output part of the content reproduction apparatus 201 and an output apparatus data input/output part of the content output apparatus 301 have an interface function compliant with the HDMI, and apparatus authentication and protection of data transfer between the content reproduction apparatus 201 and the content output apparatus 301 can be carried out by using the HDMI cable. The operation clock signal is converted into the operation clock signal in the SPDIF format, and is transmitted by the ARC transmission line in the HDMI cable. The reproduction apparatus data input/output part of the content reproduction apparatus 201 and the output apparatus data input/output part of the content output apparatus 301 include an SPDIF interface function for transmitting the operation clock signal as data in the SPDIF format on the ARC transmission line. The SPDIF interface is generally used for transmitting audio data, and can be used inexpensively without a complex circuit configuration. As described above, the audio data, the video data, and the operation clock signal can be transmitted over a single cable by using the HDMI cable.

According to this embodiment, when the operation clock signal is transmitted from the content output apparatus 301 to the content reproduction apparatus 201, an operation clock signal based on the reference operation clock signal generated by the reference operation clock generation part of the content output apparatus 301 is used as the transmission clock. As a result, the content reproduction apparatus 201 does not need to carry out processing such as decoding for unnecessary audio data, and can receive precisely the operation clock signal generated by the content output apparatus 301.

A description is now given of configurations of the content reproduction apparatus 201 and the content output apparatus according to this embodiment.

First, the content reproduction apparatus 201 includes a reproduction apparatus reference operation clock generation part 210, a reproduction apparatus operation clock conversion part 230, a content generation part 240, a reproduction apparatus signal processing part 250, a reproduction apparatus data input/output part 280, an ARC reception part 280a, and a reproduction apparatus control part 270.

The reproduction apparatus reference operation clock generation part 210 includes a crystal oscillator (not shown), and generates a reference operation clock signal serving as a reference of an operation clock signal for operating respective parts in the content reproduction apparatus 201. The reference operation clock signal is output to the reproduction apparatus operation clock conversion part 230.

The reproduction apparatus operation clock conversion part 230 receives an input of the reference operation clock signal generated by the reproduction apparatus reference operation clock generation part 210 or the received operation clock signal received from the ARC reception part 280a described later, converts, based on control by the reproduction apparatus control part 270 described later, any one of the operation clock signals into the operation clock signal at a predetermined frequency, and outputs the converted operation clock signal to the content generation part 240, the signal processing part 250, the reproduction apparatus data input/output part 280, and the like.

Further, the reproduction apparatus operation clock conversion part 230 includes a first frequency conversion part (not shown), a second frequency conversion part (not shown), and a signal switching part (not shown). The first frequency conversion part is a frequency converter which is high in input frequency gain and compatible with a signal large in frequency variation. The second frequency conversion part is a frequency converter which is low in input frequency gain and compatible with a signal relatively small in frequency variation, and can convert the signal into an operation clock signal having a frequency small in error with respect to a predetermined frequency. The signal switching part switches between the reference operation clock signal input from the reproduction apparatus reference operation clock generation part 210 to the reproduction apparatus operation clock conversion part 230 and the received operation clock signal input from the ARC reception part 280a to the reproduction apparatus operation clock conversion part 230, based on control by the reproduction apparatus control part 270 described later.

Specifically, the signal switching part switches the input source to any one of the received operation clock signal at 24 MHz generated by and output from the ARC reception part 280a when receiving the clock at 48 KHz and the reference operation clock signal at 24 MHz generated by the reproduction apparatus reference operation clock generation part 210 based on the control by the reproduction apparatus control part 270 in the reproduction apparatus operation clock conversion part 230. The first frequency conversion part converts the input operation clock signal at 24 MHz into the operation clock signal at 13.5 MHz, and outputs the operation clock signal at 13.5 MHz to the second frequency conversion part. The second frequency conversion part further converts the operation clock signal at 13.5 MHz into an operation clock signal at 27 MHz, and outputs the operation clock signal to the content generation part 240, the reproduction apparatus signal processing part 250, the reproduction apparatus data input/output part 280, and the like. Note that, the first frequency conversion part may convert the input operation clock signal at 24 MHz into an operation clock signal at 27 MHz, and may output the operation clock signal at 27 MHz to the second frequency conversion part, and the second frequency conversion part may further convert the operation clock at 27 MHz into the operation clock signal at 27 MHz.

The content generation part 240 reads content data recorded on a disc, or content data stored in a semiconductor memory, and outputs the content data to the reproduction apparatus signal processing part 250. Moreover, the content generation part 240 includes a network connection part (not shown), acquires the content data by downloading the content data stored in a server or the like via a network, or receiving a stream of the content data, and outputs the content data to the reproduction apparatus signal processing part 250.

The reproduction apparatus signal processing part 250 applies various signal processing such as decode processing to the content data generated by the content generation part 240. For example, the reproduction apparatus signal processing part 250 applies the decode processing to the audio data and the video data, multi-channel processing to the audio data, and processing such as 3D conversion to the video data.

The reproduction apparatus data input/output part 280 converts the content data output from the reproduction apparatus signal processing part 250 into data in a data format which can be transmitted on the multimedia data transmission cable 400 connected between the content reproduction apparatus 201 and the content output apparatus 301, and outputs the converted content data in order to transmit the content data from the content reproduction apparatus 201 to the content output apparatus 301. In this embodiment, the content reproduction apparatus 201 and the content output apparatus 301 are connected to each other via the HDMI cable 400, which serves as a multimedia data transmission cable. The reproduction apparatus data input/output part 280 has an HDMI interface function, and converts data into data that matches the data transmission over the HDMI interface to transmit the content data via the HDMI cable 400 to the content output apparatus 301.

The reproduction apparatus data input/output part 280 includes the ARC reception part 280a. The ARC reception part 280a receives the operation clock signal transmitted from an ARC transmission part 380a, which is described later, of the output apparatus data input/output part 380 of the content output apparatus 301 via the HDMI cable 400, converts the frequency of the received operation clock signal into a predetermined frequency by means of an integrated frequency converter (not shown), and outputs the operation clock signal (received operation clock signal) to which the frequency conversion has been applied to the reproduction apparatus operation clock conversion part 230. Specifically, the ARC reception part 280a receives the operation clock signal at 48 kHz from the content output apparatus 301, converts the operation clock signal into the operation clock signal at 24 MHz by means of the integrated frequency converter, and outputs the operation clock signal at 24 MHz to the reproduction apparatus operation clock conversion part 230.

The operation clock signal at 24 MHz input from the ARC reception part 280a is the received operation clock signal generated based on the operation clock signal at 48 kHz transmitted via the HDMI cable 400, and is a signal large in frequency variation with respect to the reference frequency. Therefore, the first frequency conversion part high in input frequency gain converts the operation clock signal into the operation clock signal narrow in frequency variation range with respect to the frequency serving as the reference. In other words, the operation clock signal at 24 MHz is converted into the operation clock signal having a frequency range of 13.5 MHz±5%. Then, the operation clock signal in the frequency range of 13.5 MHz±5% output from the first frequency conversion part is converted into the operation clock signal narrower in frequency variation range with respect to the predetermined frequency and high in precision by the second frequency conversion part low in the input frequency gain. In other words, the operation clock signal in the frequency range of 13.5 MHz±5% is converted into the operation clock signal in a frequency range of 27 kHz±0.5%, and the operation clock signal is output to the content generation part 240, the reproduction apparatus signal processing part 250, the reproduction apparatus data input/output part 280, and the like. The content generation part 240, the reproduction apparatus signal processing part 250, the reproduction apparatus data input/output part 280, and the like operate in synchronization with the operation clock signal small in error with respect to the predetermined frequency. Therefore, the content generation part 240, the reproduction apparatus signal processing part 250, the reproduction apparatus data input/output part 280, and the like operate without a loss in synchronization and the like.

The reproduction apparatus control part 270 controls the overall content reproduction apparatus 201. The reproduction apparatus control part 270 provides control to convert the frequency of the operation clock signal in the reproduction apparatus operation clock conversion part 230 based on the operation clock signal received from the content output apparatus 301, thereby operating the content generation part 240, the reproduction apparatus signal processing part 250, the reproduction apparatus data input/output part 280, and the like based on the operation clock signal, and transmitting the content data to the content output apparatus 301.

Further, the reproduction apparatus control part 270 detects whether the operation clock signal can be received from the content output apparatus 301 based on turning on/off of the power supply, setting by the user, the connection of the HDMI cable 400, and the like, and if the operation clock signal can be received from the content output apparatus 301, controls the signal switching part of the reproduction apparatus operation clock conversion part 230 to generate the operation clock signal based on the received operation clock signal received by the ARC reception part 280a, thereby controlling the respective parts in the apparatus to operate. Moreover, the reproduction apparatus control part 270 detects whether the operation clock signal can be received from the content output apparatus 301, and if the reproduction apparatus control part 270 detects that the operation clock signal cannot be received from the content output apparatus 301, controls the signal switching part of the reproduction apparatus operation clock conversion part 230 to generate the operation clock signal based on the reference operation clock signal output by the reproduction apparatus reference operation clock generation part 210, thereby controlling the respective parts in the apparatus to operate.

Next, the content output apparatus 301 includes an output apparatus data input/output part 380, an ARC transmission part 380a an output apparatus signal processing part 320, an output part 330, an output apparatus reference operation clock generation part 340, and an output apparatus control part 360.

The output apparatus data input/output part 380 receives the content data transmitted via the HDMI cable 400 from the content reproduction apparatus 201. The output apparatus data input/output part 380 outputs the received content data to the output apparatus signal processing part 320.

The output apparatus signal processing part 320 applies signal processing to the content data input by the output apparatus data input/output part 380 into the content output apparatus 301, and outputs the processed content data to the output part 330. On this occasion, the signal processing applied to the content data includes, for example, the surround conversion processing applied to the audio data, and the superimposing processing for the on-screen display (OSD) signal applied to the video data.

The output part 330 includes an amplification part (not shown) for amplifying the audio data, and a video encoder (not shown) for converting the video data into a video signal format for displaying the video data on a television set or a monitor. The output part 330 separates the content data to which the signal processing has been applied by the output apparatus signal processing part 320 into the video data and the audio data, and outputs the video data and the audio data to an outside of the content output apparatus 301. The audio data is output via the amplification part to speakers or the like connected to output terminals with a connection cable or the like. The video data is output via the video encoder to a television set or a monitor connected to output terminals with a connection cable or the like.

The output apparatus reference operation clock generation part 340 includes a crystal oscillator (not shown), and generates the reference operation clock signal. In this embodiment, the reference operation clock signal serves as a reference for the operation clock signal of the content output apparatus 301, and as a reference for the operation clock signal to be transmitted to the content reproduction apparatus 201. Specifically, the output apparatus reference operation clock generation part 340 generates a reference operation clock signal at 24 MHz, and outputs the reference operation clock signal to the output apparatus data input/output part 380, the output apparatus signal processing part 320, the output part 330, and the like.

The ARC transmission part 380a converts the frequency of the reference operation clock signal generated by the output apparatus reference operation clock generation part 340 into the predetermined frequency, then converts the reference operation clock signal into the reference operation clock signal in the SPDIF format, and transmits the operation clock signal via the data transmission line of the HDMI cable 400 to the content reproduction apparatus 201. In this embodiment, the reference operation clock signal at 24 MHz generated by the output apparatus reference operation clock generation part 340 is converted into the operation clock signal having a frequency of 48 kHz, and the operation clock signal is transmitted via the data transmission line of the HDMI cable 400 to the content reproduction apparatus 201.

The output apparatus control part 360 controls the overall content output apparatus 301. The output apparatus control part 360 provides the control of converting the reference operation clock signal generated by the output apparatus reference operation clock generation part 340 into the reference operation clock signal in the SPDIF format and transmitting the reference operation clock signal from the ARC transmission part 380a via the HDMI cable 400 to the content reproduction apparatus 201, and the control of receiving the content data transmitted from the content reproduction apparatus 201, applying the signal processing to the content data, and then, outputting the content data from the output part 330 to the outside.

A description is now given of processing of transmitting the content data between the content reproduction apparatus 201 and the content output apparatus 301.

Figure 5:
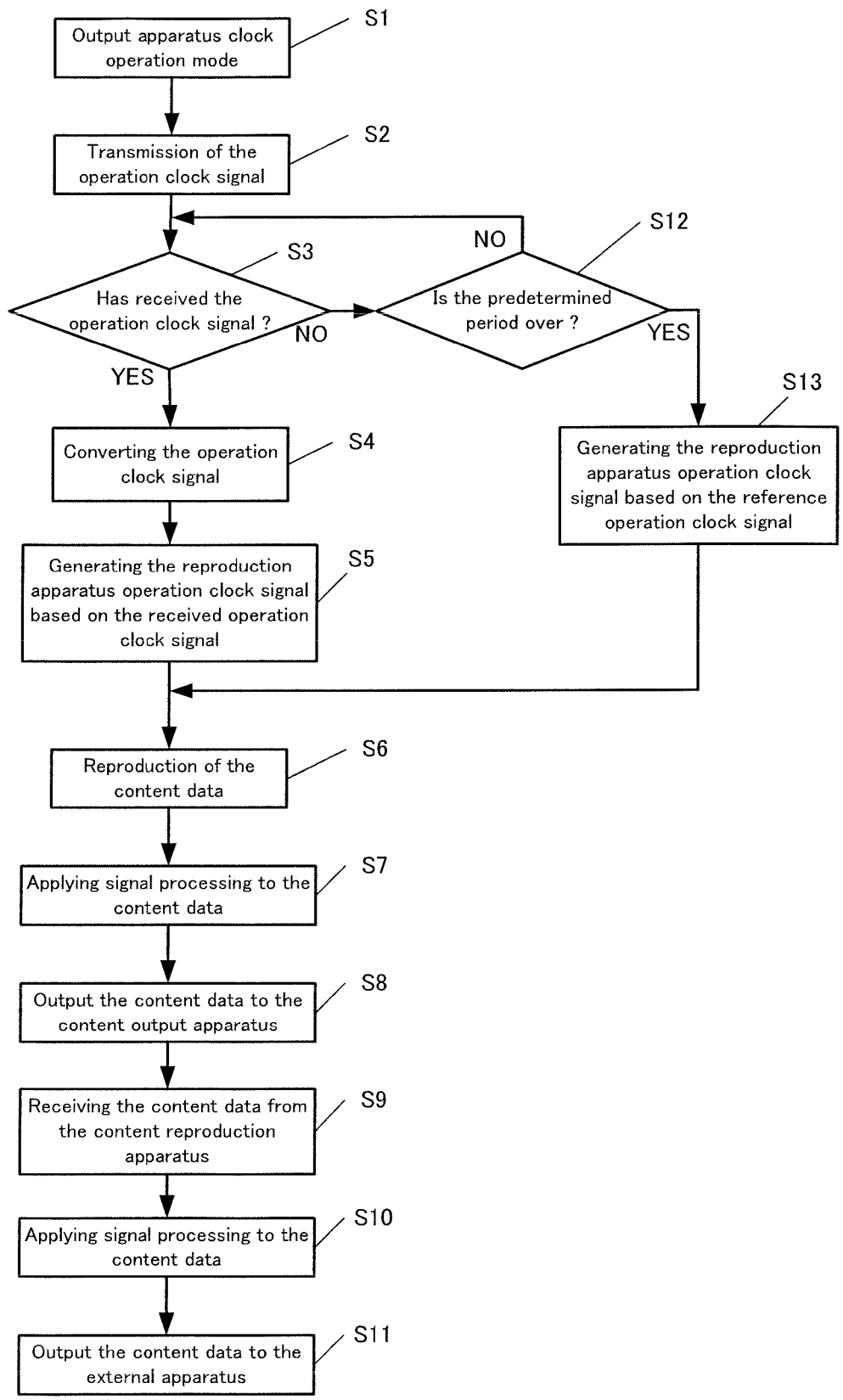
FIG. 5 is a flowchart illustrating processing relating to the content data transmission in the content data transmission system according to the second embodiment of the present invention.

FIG. 5 is a flowchart illustrating the processing relating to the content data transmission in the content data transmission system according to the second embodiment of the present invention.

As described in the first embodiment, when the mode check processing illustrated in FIG. 2 is finished, the content reproduction apparatus 201 and the content output apparatus 301 are set to such a state that the content reproduction apparatus 201 and the content output apparatus 301 can operate in the output apparatus clock operation mode (S1). When the content output apparatus 301 becomes operable in the output apparatus clock operation mode, the content output apparatus 301 transmits such a notification that the operation clock signal is transmitted via the HDMI cable 400 to the content reproduction apparatus 201, and the ARC transmission part 380a starts the transmission of the operation clock signal to the ARC reception part 280a via the HDMI cable 400 (S2).

Specifically, in the content output apparatus 301, the switch of the mode causes the ARC transmission part 380a to generate the operation clock signal at 48 kHz based on the reference operation clock signal generated by the output apparatus reference operation clock generation part 340, and to start the transmission of the operation clock via the HDMI cable 400 to the content reproduction apparatus 201.

The reproduction apparatus control part 270 of the content reproduction apparatus 201 checks whether the ARC reception part 280a has received the operation clock signal at 48 kHz from the content output apparatus 301 or not (S3), and when the ARC reception part 280a receives the operation clock signal (YES in S3), the ARC reception part 280a generates the operation clock signal at 24 MHz based on the received operation clock signal, and outputs the generated operation clock signal to the reproduction apparatus operation clock conversion part 230 (S4). Regarding the reception of the operation clock signal (S3), if the operation clock signal can be received within a predetermined elapsed time (NO in S3, and NO in S12) (YES in S3), the content reproduction apparatus 201 generates the received operation clock signal based on the received operation clock signal, and outputs the received operation clock signal to the reproduction apparatus operation clock conversion part 230 (S4).

The reproduction apparatus clock conversion part 230 generates the synchronized operation clock signal (reproduction apparatus operation clock signal) at 27 MHz based on the received operation clock signal at 24 MHz, and outputs the operation clock signal to the content generation part 240, the reproduction apparatus signal processing part 250, and the reproduction apparatus data input/output part 280 (S5).

On this occasion (S3), if the ARC reception part 280a cannot receive the operation clock signal from the content output apparatus 301 within a predetermined period due to a defect of the HDMI cable 400 or the like after the operation in the output apparatus clock operation mode starts (NO in S3, YES in S12), the reproduction apparatus control part 270 switches the output apparatus clock operation mode, and provides such control that the reproduction apparatus operation clock signal is generated based on the reference operation clock signal generated by the reproduction apparatus reference operation clock generation part 210 (S13) to operate the apparatus. The predetermined period in S12 is, for example, approximately five seconds.

If the content reproduction apparatus 201 cannot receive the operation clock signal within the predetermined period from the content output apparatus 301, the reproduction apparatus control part 270 controls the content reproduction apparatus 201 to operate based on the reproduction apparatus operation clock signal generated based on the reference operation clock signal in the content reproduction apparatus 201, and thus such a case that the content data is not output from the content reproduction apparatus 201 for a long period is prevented from occurring. As a result, even if a transmission error of the operation clock signal occurs between the content reproduction apparatus 201 and the content output apparatus 301, the user does not need to carry out a complex change in setting, and can listen to or view the content via the content output apparatus 301.

Moreover, if the setting is switched from the output apparatus clock operation mode due to the transmission error of the operation clock signal as described above, the reproduction apparatus control part 270 presents such a notification that the mode setting has been changed on a display part (not shown) of the content reproduction apparatus 201, thereby notifying the user of the change. As a result of the display and notification, the user can recognize that the operation is not carried out in the output apparatus clock operation mode. Moreover, if such a defect that the HDMI cable 400 is disconnected occurs, or a connection failure of the HDMI cable 400 occurs, the user can recognize the situation.

The content generation part 240 operates based on the operation clock signal supplied from the reproduction apparatus operation clock conversion part 230, reads content data from a mounted disc or downloads content data via the network, and outputs the content data to the reproduction apparatus signal processing part 250 (S6).

The reproduction apparatus signal processing part 250 also operates based on the operation clock signal supplied from the reproduction apparatus operation clock conversion part 230, applies predetermined signal processing to the content data input from the content generation part 240, and outputs the content data to the reproduction apparatus data input/output part 280 (S7).

The reproduction apparatus data input/output part 280 also operates based on the operation clock signal supplied from the reproduction apparatus operation clock conversion part 230, converts the content data input from the reproduction apparatus signal processing part 250 into content data in a predetermined signal format, and transmits the content data via the HDMI cable 400 to the content output apparatus 301 (S8).

The output apparatus data input/output part 380 receives the content data output from the content reproduction apparatus 201 (S9), converts the signal format into a predetermined format, and outputs the content data to the output apparatus signal processing part 320 in the content output apparatus 301 (Step 10). The respective parts of the content output apparatus 301 (in FIG. 4, the output apparatus data input/output part 380, the output apparatus signal processing part 320, and the output part 330) operate based on the operation clock signal generated by the output apparatus reference operation clock generation part 340.

The output apparatus signal processing part 320 applies predetermined signal processing to the content data output from the output apparatus data input/output part 380, and outputs the processed content data to the output part 330 (S10). The output part 330 applies signal processing, specifically, amplifies the audio data, applies video encoding processing to the video data, and then outputs the audio data and the video data as the video signal and the audio signal, respectively, to the external apparatus (S11).

A description has been given of the content data transmission system 101 according to this embodiment configured so that the mode check processing is carried out in order to check whether the content reproduction apparatus 201 and the content output apparatus 301 are each compatible with the output apparatus clock operation mode or not, but the content data transmission system 101 may be configured so that the mode check processing is not carried out, data representing that the operation clock signal is output from the content output apparatus 301 is superimposed on the operation clock signal in order to check the reliability of the clock signal input to the reproduction apparatus data input/output part 280, and only if the operation clock signal received on the content reproduction apparatus 201 side is superimposed with the data representing that the operation clock signal is output from the content output apparatus 301, the content data transmission system 101 operates in the output apparatus clock operation mode. For example, if The output apparatus data input/output part 380 transmits the operation clock to the reproduction apparatus data input/output part 280, the output apparatus control part 360 may control the ARC transmission part 380a so as to transmit the operation clock signal superimposed with a predetermined bi-phase signal. The reproduction apparatus control part 270 may determine whether the predetermined bi-phase signal is superimposed on the operation clock received by the reproduction apparatus data input/output part 280. If the bi-phase signal is superimposed, the reproduction apparatus control part 270 may provide control so as to operate in the output apparatus clock operation mode, and if the bi-phase signal is not superimposed, may switch the signal switching part of the reproduction apparatus operation clock conversion part 230 to generate the reproduction apparatus operation clock signal based on the reference operation clock signal generated by the reproduction apparatus reference operation clock generation part 210, and may provide control so as to operate based on the reproduction apparatus operation clock signal. As a result, a circuit configuration required for the mode check processing can be omitted, and a time required for the mode check processing can be reduced. Moreover, even if an operation clock signal transmitted from an apparatus other than the content output apparatus 301 is received by any chance while the HDMI cable 400 is connected to the apparatus other than the content output apparatus 301, a jitter can be prevented from being generated on the audio data to be reproduced, and the sound quality and the image quality can be prevented from degrading.

In the content data transmission system 101 according to this embodiment, the ARC transmission part 380a transmits the operation clock signal at 48 kHz to the ARC reception part 280a, the operation clock signal at 27 MHz is generated from the operation clock signal at 48 kHz, the operation clock signal at 24 MHz, which is the operation clock signal for the 48 kHz system, and an operation clock signal at 22 MHz, which is the operation clock signal for a 44.1 kHz system, are generated from the operation clock signal at 27 MHz, but the content data transmission system 101 may be configured, for example, to switch and transmit the plurality of clock signals. For example, the ARC transmission part 380a is configured so as to switch and transmit the operation clock signal at 48 kHz and the operation clock signal at 44.1 kHz, and the ARC reception part 280a is configured to operate based on the received operation clock frequency. As a result, for example, when content data including video data recorded on a recording medium such as a DVD and a BD is reproduced, the switching can be made so as to operate based on the operation clock signal at 48 kHz, and when content data not including video data recorded on a recording medium such as a CD is reproduced, the switching can be made so as to operate based on the operation clock signal at 44.1 kHz, and hence an arbitrary operation clock is selected for operation out of the plurality of the operation clocks depending on content data to be reproduced.

INDUSTRIAL APPLICABILITY

The present invention can be applied to the content data transmission system including the content reproduction apparatus for reproducing the content data, and the content output apparatus for applying the signal processing and the amplification to the content data and outputting the content data.

REFERENCE SIGNS LIST

100 . . . content data transmission system
200 . . . content reproduction apparatus, 210 . . . reproduction apparatus reference operation clock generation part, 220 . . . operation clock reception part, 230 . . . reproduction apparatus operation clock conversion part, 240 . . . content generation part, 250 . . . reproduction apparatus signal processing part, 260 . . . data output part
300 . . . content output apparatus, 310 . . . data input part, 320 . . . output apparatus signal processing part, 330 . . . output part, 340 . . . output apparatus reference operation clock generation part, 350 . . . operation clock transmission part, 360 . . . output apparatus control part
400 . . . multimedia data transmission cable
500 . . . operation clock transmission cable
101 . . . content data transmission system
201 . . . content reproduction apparatus
280 . . . reproduction apparatus data input/output part, 280a . . . ARC reception part
301 . . . content output apparatus
380 . . . output apparatus data input/output part, 380a . . . ARC transmission part

The invention claimed is:
1. A content data transmission system, comprising:
a content reproduction apparatus for reproducing content data; and
a content output apparatus for inputting the content data reproduced by the content reproduction apparatus, applying signal processing to the content data, and outputting the content data, wherein:
the content reproduction apparatus comprises:
a reproduction apparatus reference operation clock generation part for generating a reproduction apparatus reference operation clock signal;
an operation clock reception part for receiving an operation clock signal transmitted from the content output apparatus via an operation clock transmission cable, and outputting a received operation clock signal synchronized with the operation clock signal;
a reproduction apparatus operation clock conversion part for converting any one of the reproduction apparatus reference operation clock signal and the received operation clock signal into a reproduction apparatus operation clock signal;
a content reproduction part for operating based on the reproduction apparatus operation clock signal, and reproducing the content data;
a data output part for operating based on the reproduction apparatus operation clock signal, and transmitting the content data via a multimedia transmission cable to the content output apparatus; and
a reproduction apparatus control part for controlling the overall content reproduction apparatus, and controlling the reproduction apparatus operation clock signal; and
the content output apparatus comprises:
an output apparatus reference operation clock generation part for generating an output apparatus reference operation clock signal;
an operation clock transmission part for generating the operation clock signal to be transmitted to the content reproduction apparatus based on the output apparatus reference operation clock signal, and transmitting the operation clock signal via the operation clock transmission cable to the content reproduction apparatus;
- a data input part for operating based on the output apparatus reference operation clock signal, and inputting the content data transmitted from the content reproduction apparatus via the multimedia transmission cable;
- an output part for operating based on the output apparatus reference operation clock signal, and outputting the content data to an outside; and
- an output apparatus control part for controlling the overall content output apparatus, and providing control to transmit, to the content reproduction apparatus, the operation clock signal synchronized with the output apparatus reference operation clock signal from the operation clock transmission part.

2. A content data transmission system according to claim 1, wherein when the reproduction apparatus control part detects connection of the multimedia data transmission cable, the reproduction apparatus control part checks whether or not the content output apparatus is compatible with an output apparatus clock operation mode in which the content reproduction apparatus operates based on the output apparatus reference operation clock signal, and when the content output apparatus is compatible with the output apparatus clock operation mode, controls the content reproduction apparatus so that the content reproduction apparatus operates in the output apparatus clock operation mode, and when the output apparatus control part of the content output apparatus confirms that the content reproduction apparatus is compatible with the output apparatus clock operation mode, the output apparatus control part provides control to automatically transmit the operation clock signal to the content reproduction apparatus, and the operation clock transmission cable comprises a SPDIF compliant cable.

3. A content data transmission system according to claim 1, wherein the reproduction apparatus control part controls, when the operation clock reception part receives the operation clock signal from the content output apparatus, the reproduction apparatus operation clock conversion part so that the reproduction apparatus operation clock conversion part converts the received operation clock signal output by the operation clock reception part into the reproduction apparatus operation clock signal, and controls, when the operation clock reception part fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus reference operation clock generation part into the reproduction apparatus operation clock signal.

4. A content data transmission system, comprising:
- a content reproduction apparatus for reproducing content data; and
- a content output apparatus for applying signal processing to the content data reproduced and transmitted by the content reproduction apparatus, and outputting the content data, wherein:
  the content reproduction apparatus comprises:
  - a reproduction apparatus reference operation clock generation part for generating a reference operation clock signal;
  - a reproduction apparatus data input/output part for operating based on a reproduction apparatus operation clock signal, outputting the content data via a multimedia transmission cable, receiving an operation clock signal transmitted from the content output apparatus via the multimedia transmission cable, and outputting a received operation clock signal synchronized with the operation clock signal;
  - a reproduction apparatus operation clock conversion part for converting any one of the reference operation clock signal generated by the reproduction apparatus reference operation clock generation part and the received operation clock signal output by the reproduction apparatus data input/output part into a reproduction apparatus operation clock signal;
  - a content generation part for operating based on the reproduction apparatus operation clock signal, and generating the content data; and
  - a reproduction apparatus control part for controlling the overall content reproduction apparatus, and controlling the reproduction apparatus operation clock signal;
  the content output apparatus comprises:
  - an output apparatus reference operation clock generation part for generating a reference operation clock signal;
  - an output apparatus data input/output part for generating the operation clock signal to be transmitted to the content reproduction apparatus based on the reference operation clock signal generated by the output apparatus reference operation clock generation part, transmitting the operation clock signal via the multimedia transmission cable to the content reproduction apparatus, operating based on the output apparatus reference operation clock signal, and inputting the content data transmitted from the content reproduction apparatus via the multimedia transmission cable;
  - an output part for operating based on the reference operation clock signal generated by the output apparatus reference operation clock generation part, and outputting the content data to an outside; and
  - an output apparatus control part for controlling the overall content output apparatus, and providing control to transmit, to the content reproduction apparatus, the operation clock signal synchronized with the output apparatus reference operation clock signal from the output apparatus data input/output part; and
  the reproduction apparatus control part controls, when the reproduction apparatus data input/output part receives the operation clock signal from the content output apparatus, the reproduction apparatus operation clock conversion part so that the reproduction apparatus operation clock conversion part converts the received operation clock signal output by the reproduction apparatus data input/output part into the reproduction apparatus operation clock signal, and controls, when the reproduction apparatus data input/output fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus reference operation clock generation part into the reproduction apparatus operation clock signal.

5. A content data transmission system according to claim 4, wherein the multimedia transmission cable comprises a High-Definition Multimedia Interface (HDMI) cable, and the reproduction apparatus data input/output part and the output apparatus data input/output part comprise HDMI data input/output parts, the operation clock signal is transmitted over an Audio Return Channel (ARC) transmission line of the HDMI cable, and the operation clock transmission cable comprises a SPDIF compliant cable.

6. A method of connecting a content reproduction apparatus for reproducing content data and a content output apparatus for inputting the content data reproduced by the content reproduction apparatus, applying signal processing to the content data, and outputting the content data to each other via a multimedia data transmission cable for transmitting the content data and an operation clock transmission cable for transmitting an operation clock signal, thereby transmitting the content data from the content data reproduction apparatus to the content output apparatus, the method comprising:
- a step of checking, when connection of the multimedia data transmission cable is detected, whether the content output apparatus is compatible with an output apparatus clock operation mode in which the content reproduction apparatus operates based on an output apparatus reference operation clock signal of the content output apparatus;
- a step of changing, when the content output apparatus is compatible with the output apparatus clock operation mode, setting in the content reproduction apparatus so as to operate in the output apparatus clock operation mode;
- a step of generating an operation clock signal based on an output apparatus reference operation clock signal, and transmitting the operation clock signal via the operation clock transmission cable to the content reproduction apparatus;
- a step of receiving the operation clock signal transmitted via the operation clock transmission cable, and generating a received operation clock signal synchronized with the operation clock signal;
- a step of converting the received operation clock signal into a reproduction apparatus operation clock signal;
- a step of operating based on the reproduction apparatus operation clock signal, and reproducing the content data;
- a step of transmitting the content data via the multimedia transmission cable to the content output apparatus;
- a step of receiving the content data transmitted from the content reproduction apparatus via the multimedia transmission cable; and
- a step of operating based on the output apparatus reference operation clock signal, and outputting the content data to an outside.

7. A method of connecting between a content reproduction apparatus for reproducing content data and a content output apparatus for inputting the content data reproduced by the content reproduction apparatus, applying signal processing to the content data, and outputting the content data to each other via a multimedia data transmission cable for transmitting the content data and an operation clock transmission cable for transmitting an operation clock signal, thereby transmitting the content data from the content data reproduction apparatus to the content output apparatus, the method comprising:
- a step of generating, by the content reproduction apparatus, a reproduction apparatus reference operation clock signal;
- a step of receiving, by the content reproduction apparatus, an operation clock signal transmitted from the content output apparatus via the operation clock transmission cable, and outputting a received operation clock signal synchronized with the operation clock signal;
- a step of converting, by the content reproduction apparatus, any one of the reproduction apparatus reference operation clock signal and the received operation clock signal into a reproduction apparatus operation clock signal;
- a step of operating, by the content reproduction apparatus, based on the reproduction apparatus operation clock signal, and reproducing the content data;
- a step of operating, by the content reproduction apparatus, based on the reproduction apparatus operation clock signal, and transmitting the content data via the multimedia transmission cable to the content output apparatus;
- a step of controlling, by the content reproduction apparatus, the overall content reproduction apparatus, and controlling the reproduction apparatus operation clock signal;
- a step of generating, by the content output apparatus, an output apparatus reference operation clock signal;
- a step of generating, by the content output apparatus, the operation clock signal to be transmitted to the content reproduction apparatus based on the output apparatus reference operation clock signal, and transmitting the operation clock signal via the operation clock transmission cable to the content reproduction apparatus;
- a step of operating, by the content output apparatus, based on the output apparatus reference operation clock signal, and inputting the content data transmitted from the content reproduction apparatus via the multimedia transmission cable;
- a step of operating, by the content output apparatus, based on the output apparatus reference operation clock signal, and outputting the content data to an outside;
- a step of controlling, by the content output apparatus, the overall content output apparatus, and providing control to transmit, to the content reproduction apparatus, the operation clock signal synchronized with the output apparatus reference operation clock signal from an operation clock transmission part; and
- a step of controlling, by the content reproduction apparatus, when receives the operation clock signal from the content output apparatus, so that the reproduction apparatus operation clock conversion part converts the received operation clock signal output by the operation clock reception part into the reproduction apparatus operation clock signal, and controlling, when the operation clock reception part fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus operation clock signal.

8. A method of connecting a content reproduction apparatus for reproducing content data and a content output apparatus for applying signal processing to the content data reproduced and transmitted by the content reproduction apparatus, and outputting the content data to each other via a multimedia data transmission cable for transmitting the content data and an operation clock signal, thereby transmitting the content data from the content data reproduction apparatus to the content output apparatus, the method comprising:
- a step of generating, by the content reproduction apparatus, a reproduction apparatus reference operation clock signal;

a step of generating, by the content output apparatus, an output apparatus reference operation clock signal;

a step of generating, based on the output apparatus reference operation clock signal, an operation clock signal synchronized with the output apparatus reference operation clock signal to be transmitted from the content output apparatus to the content reproduction apparatus, and transmitting the operation clock signal via the multimedia transmission cable to the content reproduction apparatus;

a step of receiving, by the content reproduction apparatus, the operation clock signal transmitted from the content output apparatus via the multimedia operation clock transmission cable, and outputting a reproduction apparatus received operation clock signal synchronized with the operation clock signal;

a step of converting any one of the reproduction apparatus reference operation clock signal and the reproduction apparatus received operation clock signal into a reproduction apparatus operation clock signal;

a step of operating based on the reproduction apparatus operation clock signal, and reproducing the content data;

a step of operating based on the reproduction apparatus operation clock signal, and transmitting the reproduced content data via the multimedia transmission cable to the content output apparatus;

a step of operating, by the content output apparatus, based on the output apparatus reference operation clock signal, and inputting the content data transmitted from the content reproduction apparatus via the multimedia transmission cable; and a step of operating based on the output apparatus reference operation clock signal, and outputting the content data to an outside, wherein the step of converting any one of the reproduction apparatus reference operation clock signal and the reproduction apparatus received operation clock signal into the reproduction apparatus operation clock signal comprises converting, when the content reproduction apparatus receives the operation clock signal from the content output apparatus, the reproduction apparatus received operation clock signal into the reproduction apparatus operation clock signal, and converting, when the content reproduction apparatus fails to receive the operation clock signal from the content output apparatus within a predetermined period, the reproduction apparatus reference operation clock signal into the reproduction apparatus operation clock signal.

9. A content data transmission system according to claim 2, wherein the reproduction apparatus control part controls, when the operation clock reception part receives the operation clock signal from the content output apparatus, the reproduction apparatus operation clock conversion part so that the reproduction apparatus operation clock conversion part converts the received operation clock signal output by the operation clock reception part into the reproduction apparatus operation clock signal, and controls, when the operation clock reception part fails to receive the operation clock signal from the content output apparatus within a predetermined period, the reproduction apparatus operation clock conversion part so that the reproduction apparatus operation clock conversion part converts the reproduction apparatus reference operation clock signal generated by the reproduction apparatus reference operation clock generation part into the reproduction apparatus operation clock signal, and the operation clock transmission cable comprises a SPDIF compliant cable.

* * * * *